US008015748B2

(12) United States Patent
Teo

(10) Patent No.: US 8,015,748 B2
(45) Date of Patent: Sep. 13, 2011

(54) COLLAPSIBLE TRAP

(75) Inventor: Lian Hing Teo, Singapore (SG)

(73) Assignee: Lian Hing Teo, Singapore (SG)

( * ) Notice: Subject to any disclaimer, the term of this patent is extended or adjusted under 35 U.S.C. 154(b) by 72 days.

(21) Appl. No.: 12/160,102

(22) PCT Filed: Jan. 4, 2006

(86) PCT No.: PCT/SG2006/000001
§ 371 (c)(1),
(2), (4) Date: Mar. 13, 2009

(87) PCT Pub. No.: WO2007/078255
PCT Pub. Date: Jul. 12, 2007

(65) Prior Publication Data
US 2009/0217567 A1 Sep. 3, 2009

(51) Int. Cl.
*A01K 69/10* (2006.01)
*A01K 69/06* (2006.01)
(52) U.S. Cl. ............................................. 43/105; 43/100
(58) Field of Classification Search .................... 43/100, 43/102–105, 7, 11, 12
See application file for complete search history.

(56) References Cited

U.S. PATENT DOCUMENTS

| 87,740 | A | * | 3/1869 | Werdmuller | 43/11 |
| 132,476 | A | * | 10/1872 | Livaudais | 43/105 |
| 333,326 | A | * | 12/1885 | Obenchain | 43/12 |
| 335,433 | A | * | 2/1886 | Darr | 43/12 |
| 482,635 | A | * | 9/1892 | Hanish | 43/12 |
| 616,924 | A | * | 1/1899 | Heberling | 43/100 |
| 655,976 | A | * | 8/1900 | Holloway et al. | 43/12 |
| 691,465 | A | * | 1/1902 | Higgins | 43/12 |

(Continued)

FOREIGN PATENT DOCUMENTS

FR 2659830 A1 * 9/1991

(Continued)

OTHER PUBLICATIONS

WIPO, International Search Report for International Application No. PCT/PCT/SG2006/000001;Written Opinion of the International Search Authority; and Written Opinion of the International Preliminary Examining Authority.

*Primary Examiner* — Darren W Ark
(74) *Attorney, Agent, or Firm* — Intellectual Property Law Group LLP; Juneko Jackson

(57) ABSTRACT

A collapsible trap (10) particularly suitable as a crab pot for trapping crabs. The collapsible trap (10) comprises a frame structure (13) having a central axis and pliant material such as netting (15) attached to the frame structure (13). A haul line (11) is connected to the frame structure (13). The frame structure (13) comprises a plurality of elongate frame elements (31). The frame structure (13) is moveable between a retracted condition in which the frame elements (31) extend generally parallel to central axis and an extended condition in which the frame elements (31) extend outwardly of the central axis giving form and shape to the netting (15) to provide an enclosure (17) defining an entrapment zone (19). When the frame structure (13) is in the retracted condition, the netting (15) can be wrapped about the frame structure (13) to assume a compact condition for storage and transportation. In one arrangement, the enclosure (17) is configured as a cage having several entry openings (27) through which crabs can enter the enclosure (17), and an access way (81) incorporating an opening (83) for retrieval of crabs trapped within the enclosure (17).

40 Claims, 22 Drawing Sheets

U.S. PATENT DOCUMENTS

| | | | | |
|---|---|---|---|---|
| 721,913 | A * | 3/1903 | Palmer | 43/100 |
| 721,914 | A * | 3/1903 | Palmer | 43/12 |
| 872,556 | A * | 12/1907 | Carwile | 43/100 |
| 872,652 | A * | 12/1907 | Grau, Jr. et al. | 43/12 |
| 1,036,574 | A * | 8/1912 | Crane | 43/105 |
| 1,143,759 | A * | 6/1915 | Franklin | 43/12 |
| 1,158,489 | A * | 11/1915 | Halley | 43/12 |
| 1,310,553 | A * | 7/1919 | Arnold | 43/12 |
| 1,348,398 | A * | 8/1920 | Eberhardt | 43/12 |
| 1,403,171 | A * | 1/1922 | Koenig | 43/105 |
| 1,432,478 | A * | 10/1922 | McMahan | 43/12 |
| 1,463,062 | A * | 7/1923 | Roberts | 43/105 |
| 1,684,564 | A * | 9/1928 | Toppe | 43/100 |
| 1,888,138 | A * | 11/1932 | Myers et al. | 43/12 |
| 1,927,599 | A * | 9/1933 | Smith | 43/103 |
| 2,072,898 | A * | 3/1937 | Martin | 43/11 |
| 2,075,715 | A * | 3/1937 | Haun | 43/100 |
| 2,187,460 | A * | 1/1940 | McIntire | 43/7 |
| 2,194,621 | A * | 3/1940 | Skrjanc et al. | 43/12 |
| 2,587,770 | A * | 3/1952 | Schatz | 43/12 |
| 2,652,656 | A * | 9/1953 | Glasser | 43/105 |
| 2,669,798 | A * | 2/1954 | Hesch | 43/12 |
| 2,716,304 | A * | 8/1955 | Taylor | 43/100 |
| 2,728,164 | A * | 12/1955 | Mears | 43/105 |
| 2,767,501 | A * | 10/1956 | Bjorksten | 43/7 |
| 2,784,514 | A * | 3/1957 | Casson | 43/105 |
| 2,910,801 | A * | 11/1959 | Safarik et al. | 43/105 |
| 3,029,546 | A * | 4/1962 | Ruiz | 43/105 |
| 3,209,484 | A * | 10/1965 | Beamer | 43/100 |
| 3,300,890 | A * | 1/1967 | Thomassen | 43/100 |
| 3,484,981 | A * | 12/1969 | Gilmer | 43/105 |
| 3,605,320 | A * | 9/1971 | Wells | 43/100 |
| 3,645,034 | A * | 2/1972 | Pfahler | 43/105 |
| 3,800,465 | A * | 4/1974 | Rea | 43/105 |
| 3,824,734 | A * | 7/1974 | Bottos | 43/121 |
| 3,841,016 | A * | 10/1974 | Silva | 43/100 |
| 3,906,654 | A * | 9/1975 | Leslie | 43/100 |
| 3,906,655 | A * | 9/1975 | Lowenthal, Jr. | 43/105 |
| 4,138,077 | A * | 2/1979 | Okumura | 43/12 |
| 4,143,480 | A * | 3/1979 | Bott | 43/105 |
| 4,221,071 | A * | 9/1980 | Sjolund | 43/100 |
| 4,354,325 | A * | 10/1982 | Aho | 43/105 |
| 4,538,376 | A * | 9/1985 | Morton | 43/100 |
| 4,730,411 | A * | 3/1988 | Katis | 43/105 |
| 4,887,382 | A * | 12/1989 | Moritz | 43/102 |
| 4,914,856 | A * | 4/1990 | Kennedy | 43/100 |
| 4,956,935 | A * | 9/1990 | Riddell | 43/105 |
| 4,986,021 | A * | 1/1991 | Thomas | 43/104 |
| 5,174,059 | A * | 12/1992 | Durbin | 43/100 |
| 5,737,869 | A * | 4/1998 | Murguido | 43/105 |
| 5,810,191 | A * | 9/1998 | Cornelious | 43/100 |
| 6,493,985 | B2 * | 12/2002 | Matches et al. | 43/105 |
| 6,598,831 | B1 * | 7/2003 | Tardy | 244/137.2 |
| 6,786,000 | B1 * | 9/2004 | Hong | 43/105 |
| 6,840,000 | B2 * | 1/2005 | Akhtar et al. | 43/12 |
| 7,043,866 | B2 * | 5/2006 | Burkovskiy | 43/100 |
| 7,313,887 | B2 * | 1/2008 | Hibbs et al. | 43/105 |
| 7,726,064 | B2 * | 6/2010 | Harju | 43/105 |
| 2005/0005501 | A1 * | 1/2005 | Hong | 43/105 |

FOREIGN PATENT DOCUMENTS

| | | | |
|---|---|---|---|
| GB | 2388509 A | * | 11/2003 |
| GB | 2396092 A | * | 6/2004 |
| JP | 04036133 A | * | 2/1992 |
| JP | 07213196 A | * | 8/1995 |
| JP | 11225619 A | * | 8/1999 |
| JP | 2001238570 A | * | 9/2001 |
| JP | 2002291375 A | * | 10/2002 |
| JP | 2003289751 A | * | 10/2003 |
| JP | 2006025624 A | * | 2/2006 |
| JP | 2006109836 A | * | 4/2006 |
| JP | 2006158267 A | * | 6/2006 |
| NZ | 329513 A | * | 9/1999 |
| WO | WO 8707818 A1 | * | 12/1987 |
| WO | WO 8904603 A1 | * | 6/1989 |
| WO | WO 9418825 A1 | * | 9/1994 |
| WO | WO 2006064293 A1 | * | 6/2006 |

* cited by examiner

COLLAPSIBLE TRAP

BACKGROUND OF THE INVENTION

1. Field of the Invention

This invention relates to a collapsible trap. The invention has been devised particularly, although not necessarily solely, as a crustacean trap. The crustacean trap according to the invention is particularly suitable for trapping crabs, and more particularly mud crabs.

2. Background Art

A wide variety of collapsible traps are available for both recreational and commercial crabbing activities. The collapsible nature of the traps allows them to assume a collapsed condition for storage and transportation, and an erected condition for use.

Traps for crabbing are commonly referred to as crab pots and typically comprise a frame structure and netting attached to the frame structure. When such a crab pot is in the erected condition, the netting and the frame structure cooperate to provide an enclosure defining an entrapment zone into which crabs can readily enter but from which they can not readily exit.

The frame structure generally includes at least one peripheral frame configured as a ring. The peripheral frame is rigid and the netting can collapse against the rigid frame. Because the peripheral frame is rigid, it limits the extent to which the crab pot can be collapsed. While the netting can collapse against the rigid frame, the rigid frame in itself is not collapsible. Accordingly, the collapsed crab pot is of a size in the collapsed position corresponding to the size of the peripheral frame.

It is against this background that the present invention has been developed.

SUMMARY OF THE INVENTION

According to a first aspect of the present invention there is provided a collapsible trap comprising a frame structure having an axis, and pliant material associated with the frame structure, the frame structure comprising a plurality of elongate frame elements, the frame structure having a retracted condition in which the frame elements extend generally parallel to said axis and an extended condition in which the frame elements extend outwardly of the axis giving form and shape to the pliant material to provide an enclosure defining an entrapment zone, and a retrieval access way for retrieval of an animal trapped in the enclosure, the retrieval access way comprising an opening in the bottom of the enclosure and a closure flap located against the opening, whereby a retrieval path can be formed upon separation of the bottom and the flap.

When the frame structure is in the retracted condition, the pliant material can be wrapped about the frame structure (around said axis) to assume a compact condition for storage and transportation. This corresponds to the collapsed condition of the trap. In the collapsed condition, the trap occupies a volume substantially less than the volume occupied in the erected position When the frame structure is in the erected condition, the pliant material is extended to define the entrapment zone. This corresponds to the erected condition of the trap.

Preferably, the opening is provided in the bottom adjacent one edge thereof.

Preferably, the flap underlies the bottom. In this way, the weight of a target animal (such as a crab) trapped in the enclosure serves to maintain the bottom in engagement with the underlying closure flap, thereby serving to maintain the retrieval access way closed.

The bottom may comprise a bottom panel attached to the frame structure, there being a section of the bottom panel not attached to the frame structure to provide the opening in the bottom.

In one arrangement, the enclosure may be configured as a cage having a bottom and wall means upstanding from the bottom to enclose the sides and top of the entrapment zone.

In another arrangement, the enclosure may be configured as a pen having a bottom, side wall means upstanding from the bottom, and an open top.

Preferably, the pliant material comprises netting.

Preferably the elongate elements are pivotally moveable between the retracted and extended conditions.

In such an arrangement, the frame elements may be each mounted for pivotal movement and connected one to another by a flexible link at a location spaced from the first end thereof.

Preferably, the frame elements are connected one to another by the flexible link at a second end thereof opposed to the first end.

Preferably, the flexible links comprises an inextensible cable such as a steel cable.

Preferably, an actuating mechanism is provided for pivotally moving the elongate frame elements between the retracted and extended conditions.

Preferably, the actuating mechanism comprises a plurality of struts each connected to one of the elongate frame elements at a location intermediate the first end and the flexible link. Where the flexible link is attached to the second end of each elongate element, the respective strut is connected to the elongate element at a location intermediate the first and second ends thereof.

The flexible link preferably serves to limit outward pivotal movement of each frame element beyond a certain extent, whereby further outward biasing action of the strut induces an outward deflection in the frame element. This causes the frame element to assume a curved profile.

Preferably, each strut is pivotally connected at one end thereof to its respective frame element and is pivotally connected at the other end thereof to adjacent ends of other struts. More preferably, each strut is pivotally connected at said other end to a common element functioning as an actuating yoke.

Preferably, the first ends of the elongate frame elements are pivotally connected together. More preferably the first ends of the frame elements are pivotally connected to a common element functioning as a supporting yoke.

In the operational orientation of the collapsible trap when in the erected condition, the supporting yoke is above the actuating yoke.

Preferably, the trap further comprises a haul line which is connected to the (lower) actuating yoke and on which the (upper) supporting yoke is slidably supported. With this arrangement, sliding movement of the supporting yoke along the haul line causes the frame structure to move between the extended condition and the retracted condition. Specifically, sliding movement of the supporting yoke towards the actuating yoke causes the frame structure to move from the retracted condition to the extended condition, and sliding movement of the supporting yoke in the direction away from the actuating yoke causes the frame structure to move from the extended condition to the retracted condition.

Preferably, one yoke incorporates a spigot which is adapted to be received in a mating socket in the other yoke when the frame structure is in the extended condition. Preferably, the socket and spigot are configured to resist rotation therebetween when in mating engagement.

Where the enclosure is configured as a cage, there is provided at least one opening for entry of a target animal (such as a crab) into the entrapment zone. Preferably, there is a plurality of entry openings. In a typical case where the cage has four sides, there is preferably an entry opening in each one of the four sides.

Preferably, the or each entry opening comprises an entry end which opens onto the exterior of the enclosure, an exit end which opens onto the entrapment zone, and a throat section which extends between the entry and exit ends and which tapers inwardly in the direction towards the exit end. With this arrangement, the entry opening is configured as a funnel.

Where there is a plurality of entry openings, at least two of the openings may be linked one to another by at least one cable extending about the periphery of each opening. The cable interconnection between the entry openings allows one opening to enlarge to accommodate entry of a large size target animal (such as a large crab), with surplus cable material being supplied to accommodate the enlargement by contraction of that part of the cable about one or more of the other entry openings.

According to a second aspect of the present invention there is provided a collapsible trap comprising a frame structure having an axis, and pliant material associated with the frame structure, the frame structure comprising a plurality of elongate frame elements, the frame structure having a retracted condition in which the frame elements extend generally parallel to said axis and an extended condition in which the frame elements extend outwardly of the axis giving form and shape to the pliant material to provide an enclosure defining an entrapment zone, an actuating mechanism for pivotally moving the elongate frame elements between the retracted and extended conditions, the actuating mechanism comprising an actuating hub to which the plurality of frame elements are connected for pivotal movement between the extended and retracted conditions, an actuating member operably connected to the frame elements, and a haul line extending through an opening in the actuating hub and being connected to the actuating member, whereby sliding movement of the actuating hub with respect to the haul line causes the frame structure to move between the extended condition and the retracted condition.

According to a third aspect of the present invention there is provided a collapsible trap comprising a frame structure, and pliant material associated with the frame structure, the frame structure comprising a plurality of elongate frame elements, the frame structure having a retracted condition and an extended condition giving form and shape to the pliant material to provide an enclosure defining an entrapment zone, an actuating mechanism for pivotally moving the elongate frame elements between the retracted and extended conditions, the actuating mechanism comprising a plurality of struts each pivotally connected to a respective one of the frame elements at a hinge, each frame element incorporating a twisted loop formation and the respective strut having an end thereof configured for engagement with the loop formation to provide the hinge pivotally connecting the frame element and the strut.

BRIEF DESCRIPTION OF THE DRAWINGS

The invention will be better understood by reference to the following description of several specific embodiments thereof as shown in the accompanying drawings in which.

DETAILED DESCRIPTION OF SPECIFIC EMBODIMENTS

Referring to FIGS. 1 to 28 of the drawings, there is shown a collapsible trap devised particularly as a crab pot for trapping crabs.

The crab pot 10 includes a haul line 11, the free end of which is adapted to be attached to an anchoring point (not shown) such as buoy, boat or jetty. The pot 10 is intended to be deployed in a body of water at a location where crabs are to be caught. The pot 10 rests on the floor of the body of water and can be retrieved simply by hauling it upwardly by way of the haul line 11.

Figure 1:
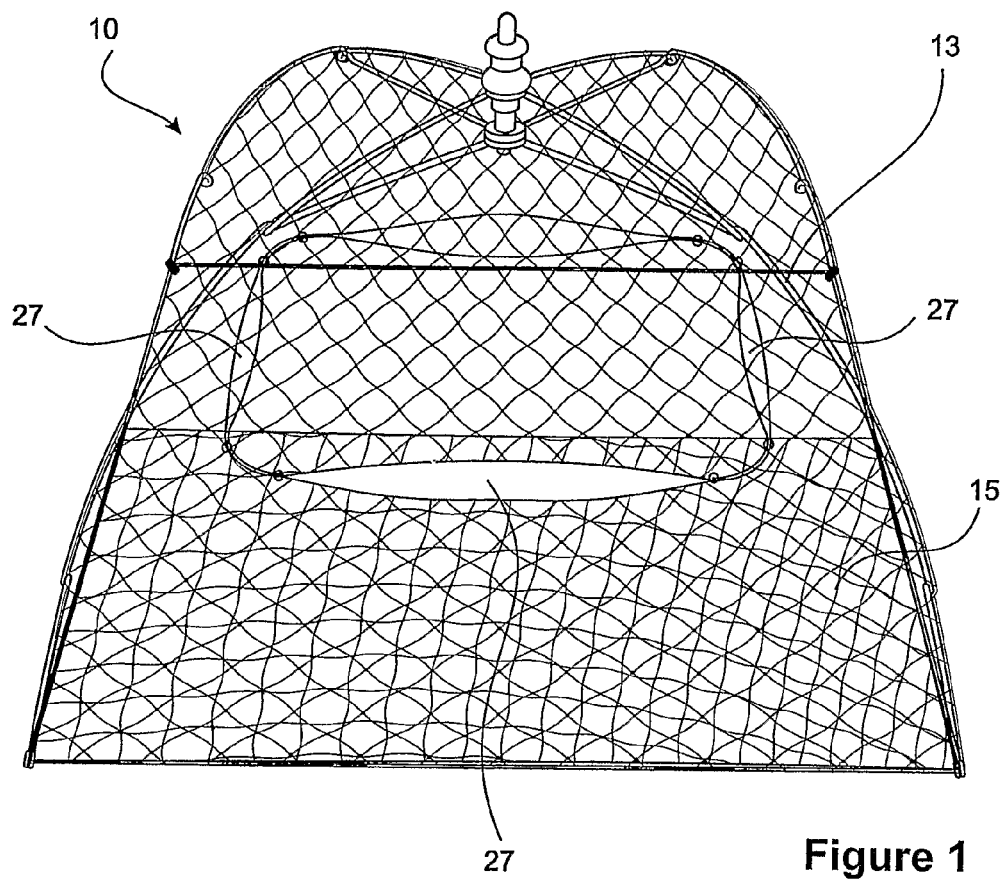
FIG. 1 is a perspective view of a collapsible crab trap according to the first embodiment, shown in an erected condition.
Figure 2:
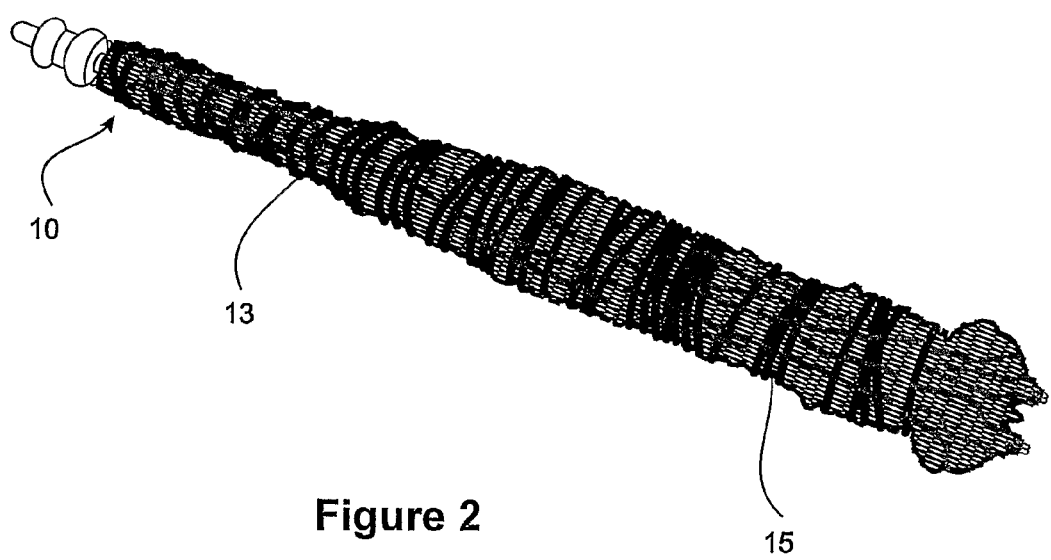
FIG. 2 is a perspective view of the collapsible crab trap of FIG. 1, shown in a collapsed condition.
Figure 3:
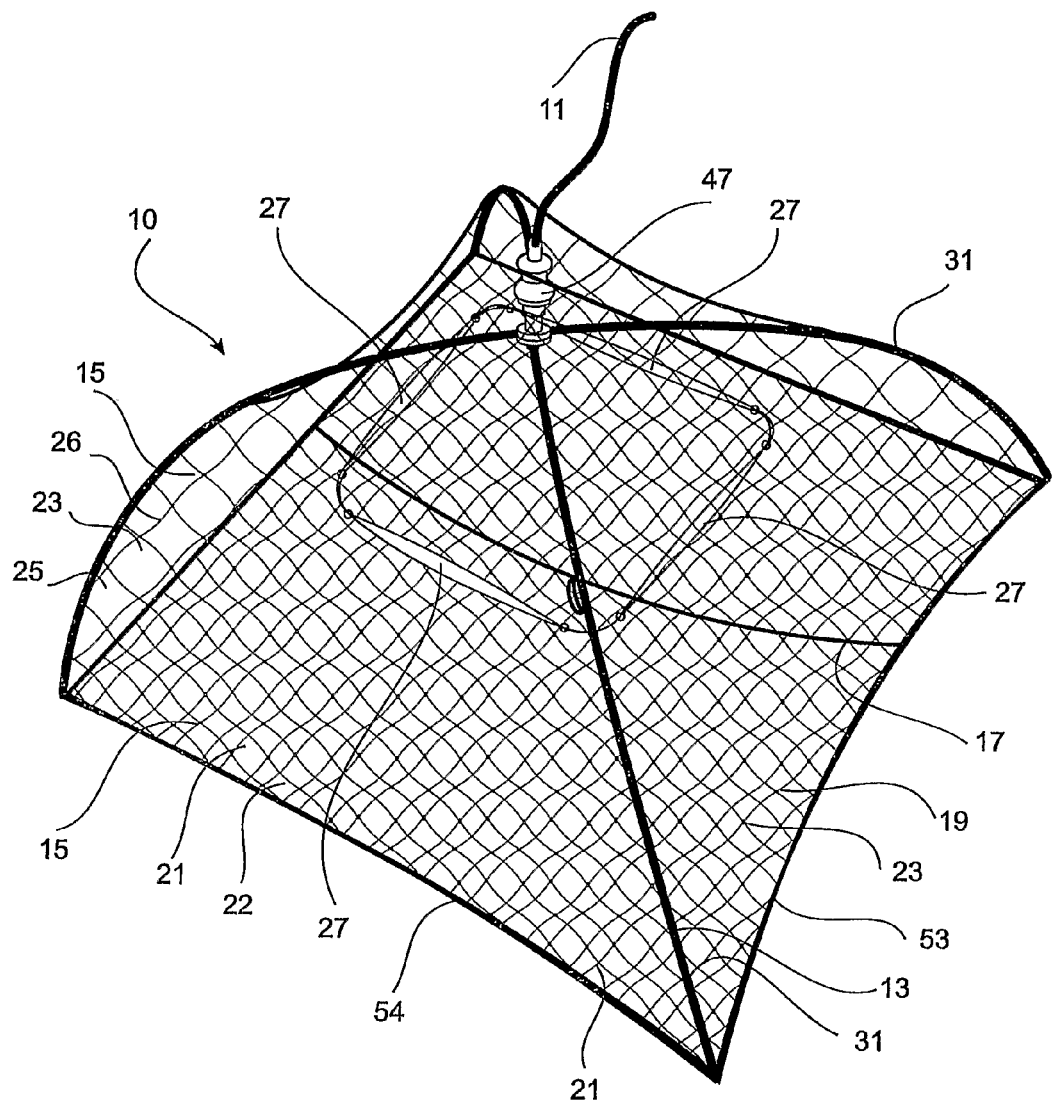
FIG. 3 is a further perspective view of the collapsible crab trap according to the first embodiment in the erected condition.
Figure 4:
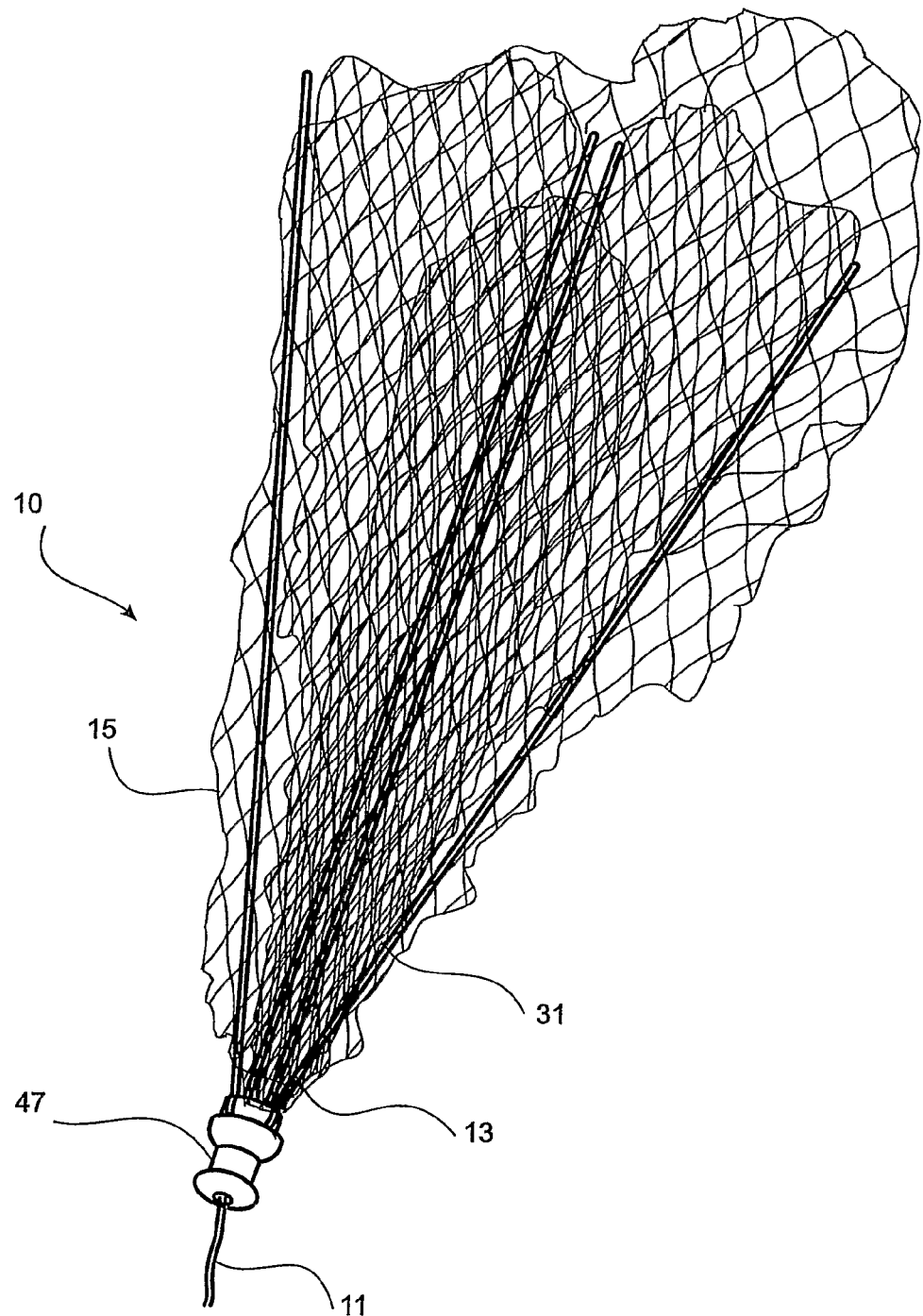
FIG. 4 is a view similar to FIG. 3 with the exception that the crab trap is shown in a partially collapsed condition.
Figure 5:
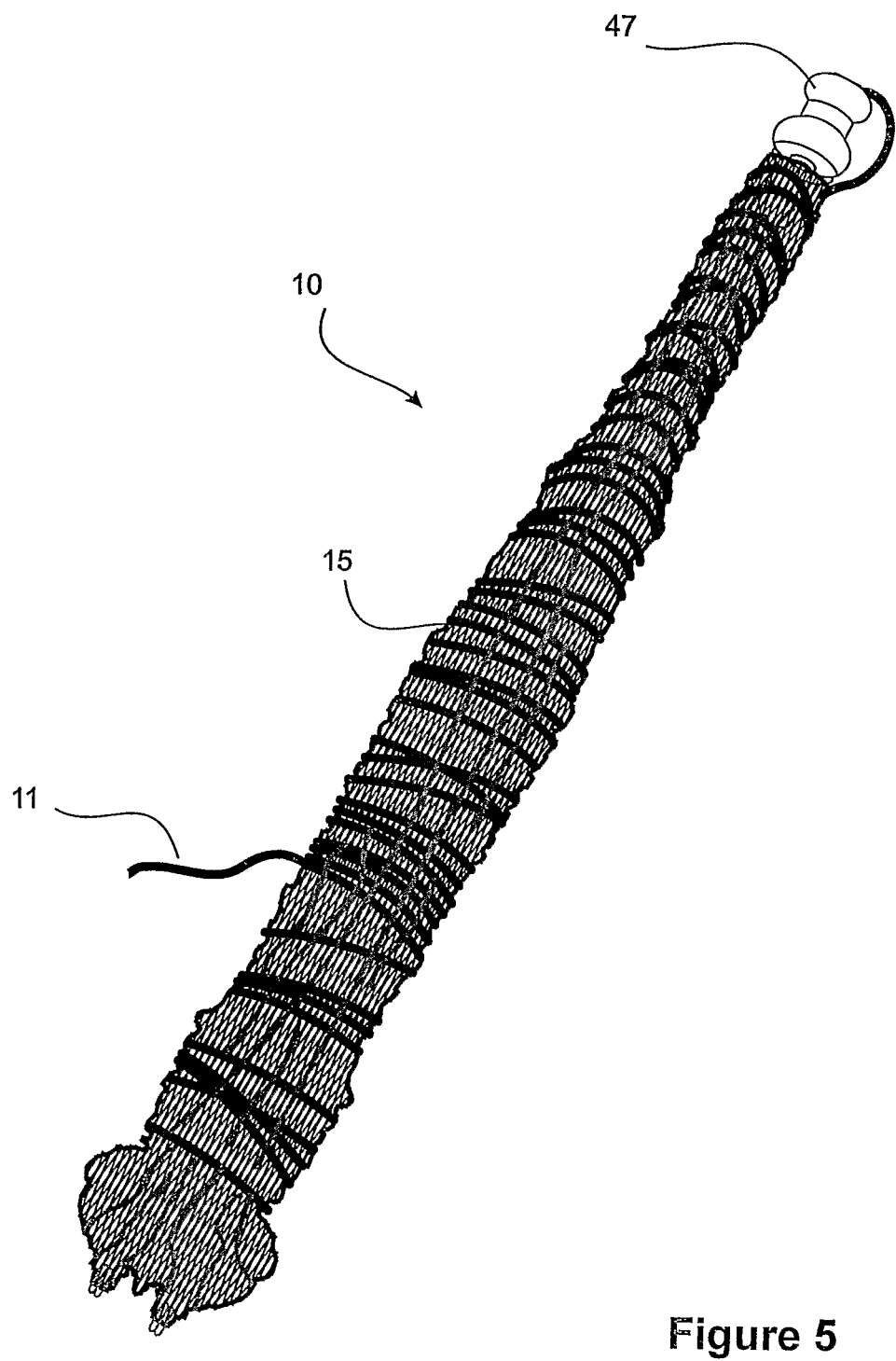
FIG. 5 is also a view similar to FIG. 3 with the exception that the crab trap is shown in the collapsed condition.
Figure 6:
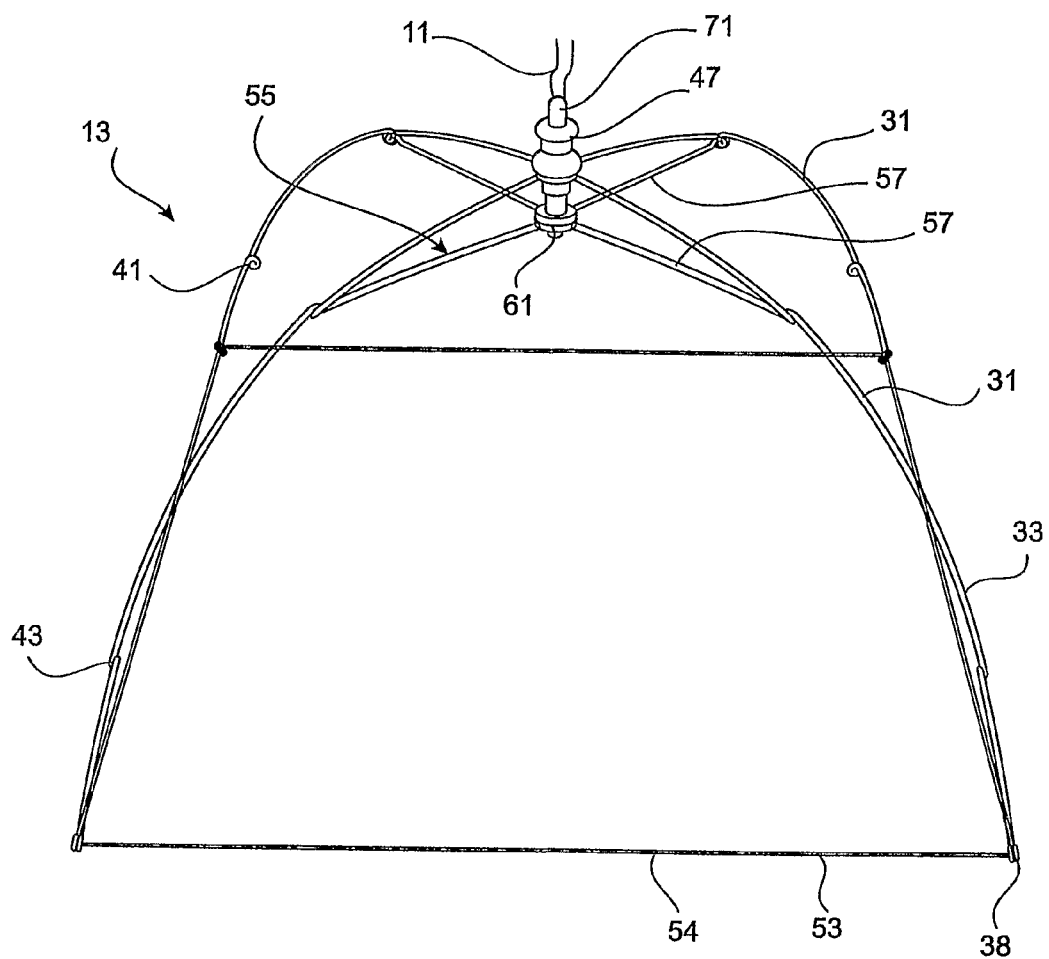
FIG. 6 is a perspective view of a frame structure forming part of the collapsible crab trap according to the first embodiment, the frame structure being shown in an extended condition.
Figure 7:
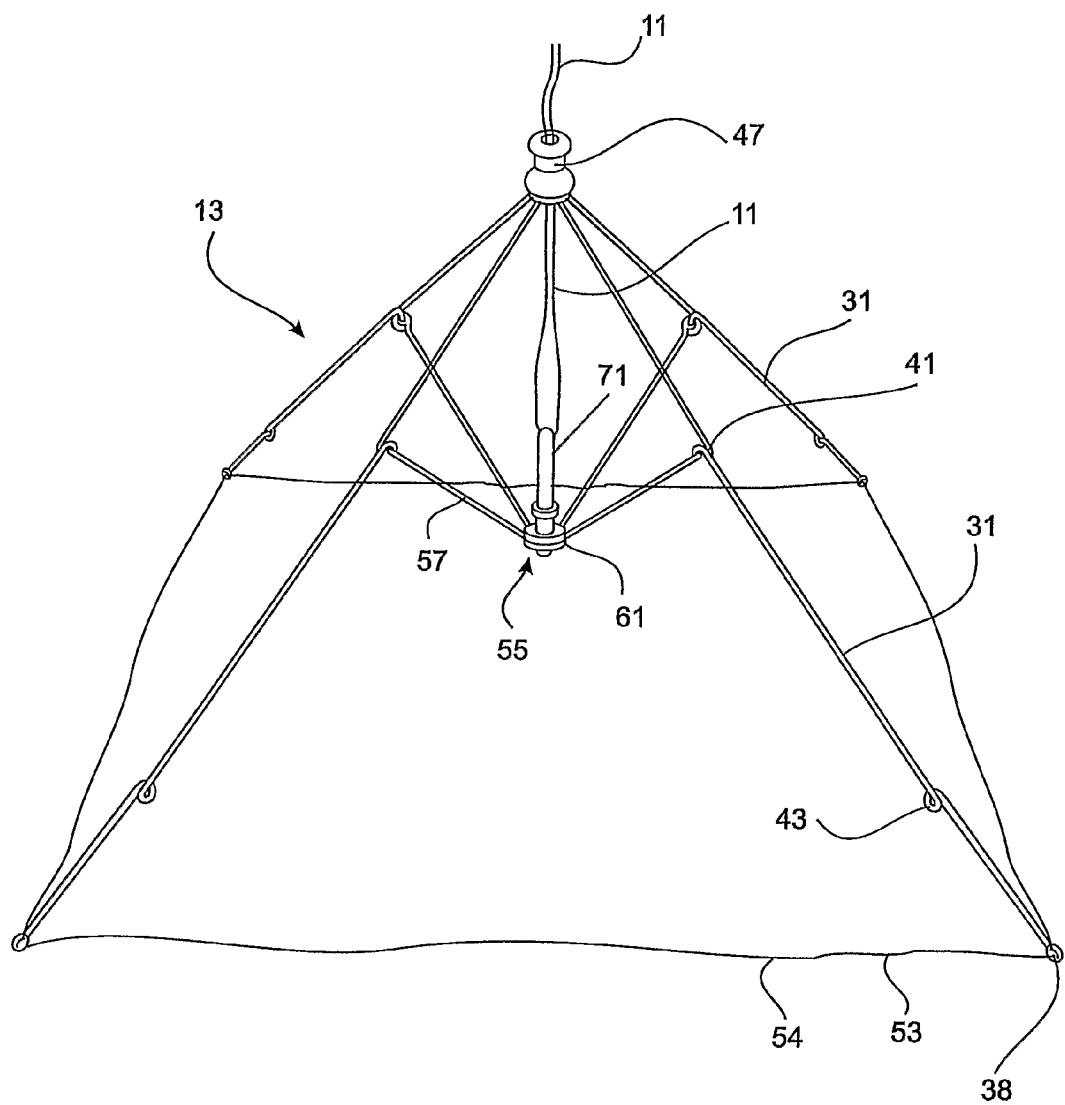
FIG. 7 is a view similar to FIG. 6, with the exception that the frame structure is shown in a partially retracted condition.
Figure 8:
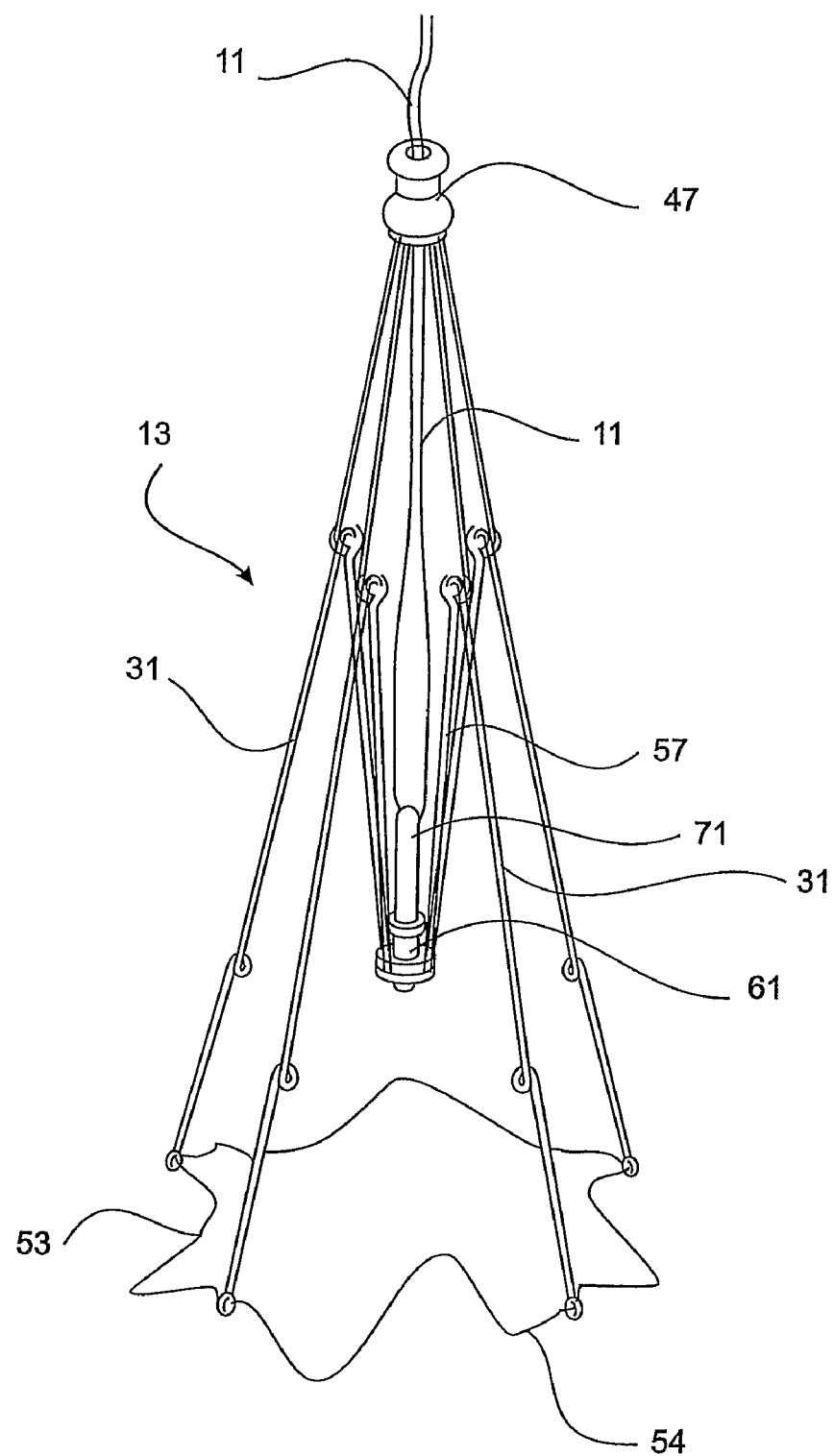
FIG. 8 is also a view similar to FIG. 6, with the exception that the frame structure is shown in a disposition approaching a retracted condition.
Figure 9:
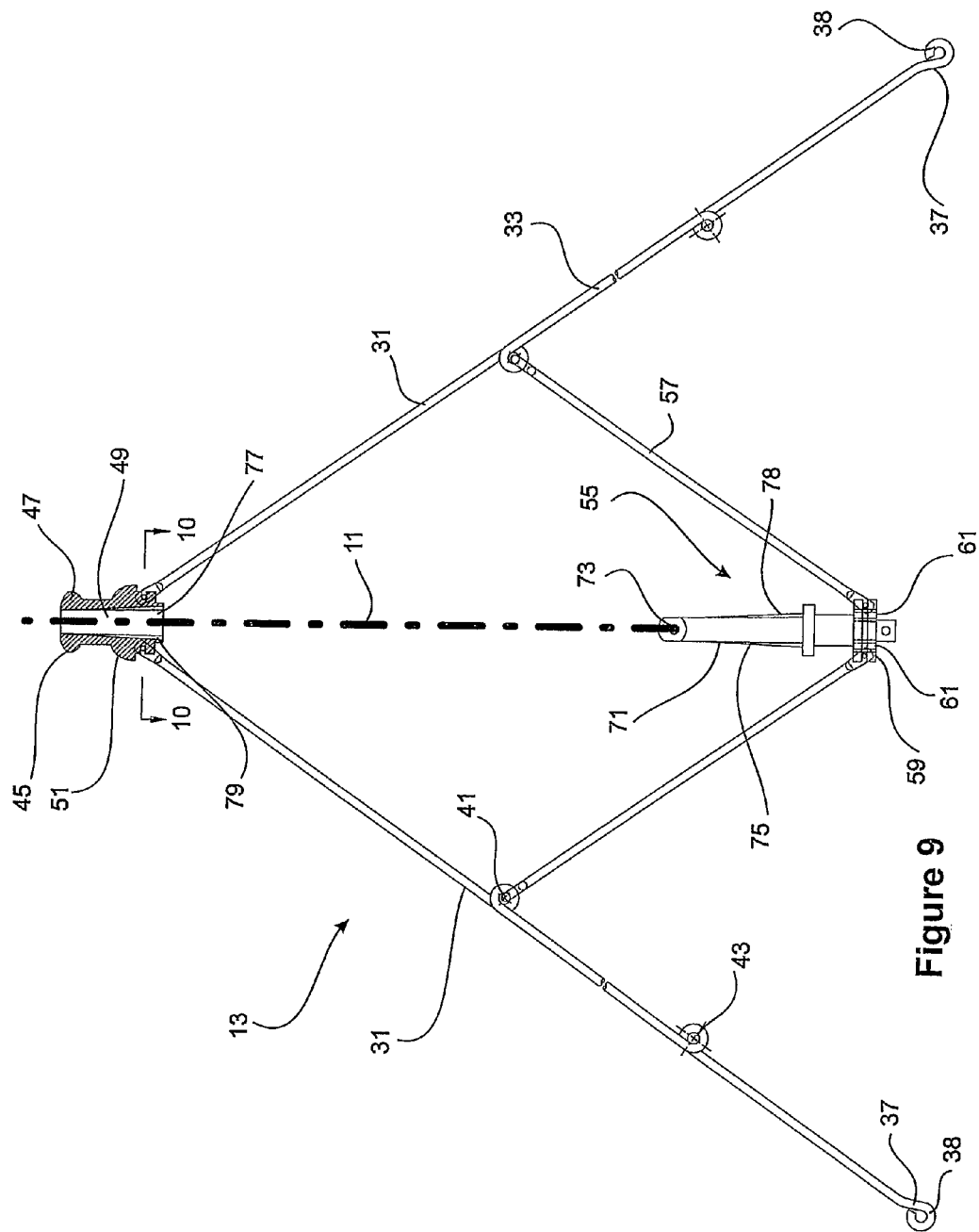
FIG. 9 is a schematic elevational view of the frame structure.
Figure 10:
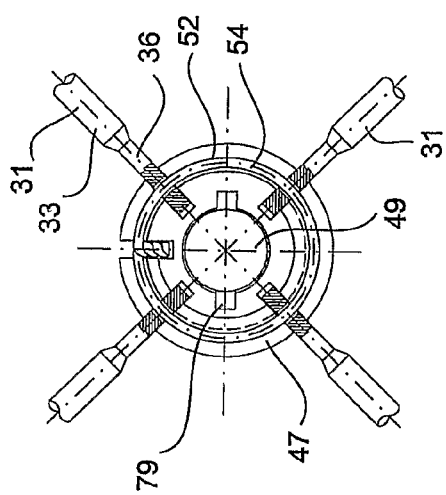
FIG. 10 is a sectional views on line 10-10 of FIG. 9.

The crab pot 10 has an erected condition as shown in FIG. 1 and a collapsed condition as shown in FIG. 2. Crabbing activities are performed with the pot 10 in the erected condition. In the collapsed condition, the pot 10 can be stowed away for transportation or storage. The compact nature of the pot 10 in the collapsed condition makes it particularly suitable for transportation in circumstances where space is limited, such as for example in backpacks, and also on small boats and kayaks.

The collapsible pot 10 comprises a frame structure 13 and netting 15 attached to the frame structure.

The frame structure 13 is movable between a retracted condition (which corresponds to the collapsed condition of the crab pot 10) and an extended condition (which corresponds to the erected condition of the crab pot). In the extended condition, the frame structure 13 gives form and shape to the netting 15 to provide an enclosure 17 defining an entrapment zone 19. When the frame structure 13 is in the retracted condition, portions of the netting 15 drape from the frame structure 13 and can be wrapped therearound, as shown in FIG. 2.

In this embodiment, the enclosure 17 is configured as a cage, having a bottom 21 and wall means 23 upstanding from the bottom to enclose the sides and top of the entrapment zone 19. The bottom 21 is of generally rectangular configuration. With such an arrangement, the side wall means 23 is of a generally dome configuration and the wall means 23 comprises four sidewalls 25, one corresponding to each side of the bottom 21.

The netting 15 comprises various sections of net material, one being a rectangular mesh panel 22 providing the enclosure bottom 21 and others being mesh panels 26 providing the side walls 25. The various mesh panels 22, 26 are secured to the frame structure 13 in any suitable way, such as binding. In certain applications, the binding may comprise degradable material such as cotton. This ensures that the pot 10 will become ineffective after some time underwater in the event that it is lost.

A suitable material for the netting 15 is monofilament nylon netting, as it offers reduced resistance (water drag) during retrieval of the pot 10 from underwater.

Each sidewall 25 has an entry opening 27 through which crabs can enter the enclosure 17. The entry openings 27 are configured to facilitate entry of crabs into the entrapment zone 19 within the enclosure 17 while also impeding any subsequent escape from the entrapment zone.

Figure 18:
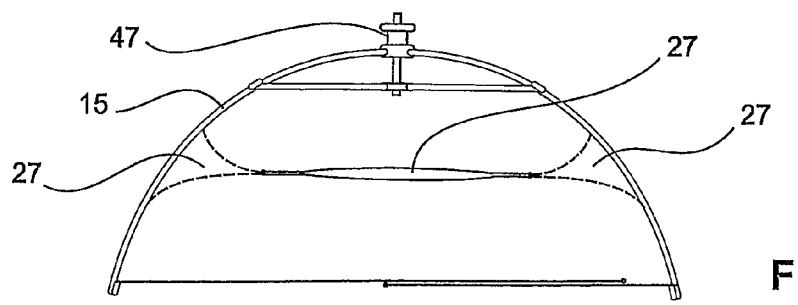
FIG. 18 is a schematic side view of the crab trap, illustrating in particular the entry openings.
Figure 19:
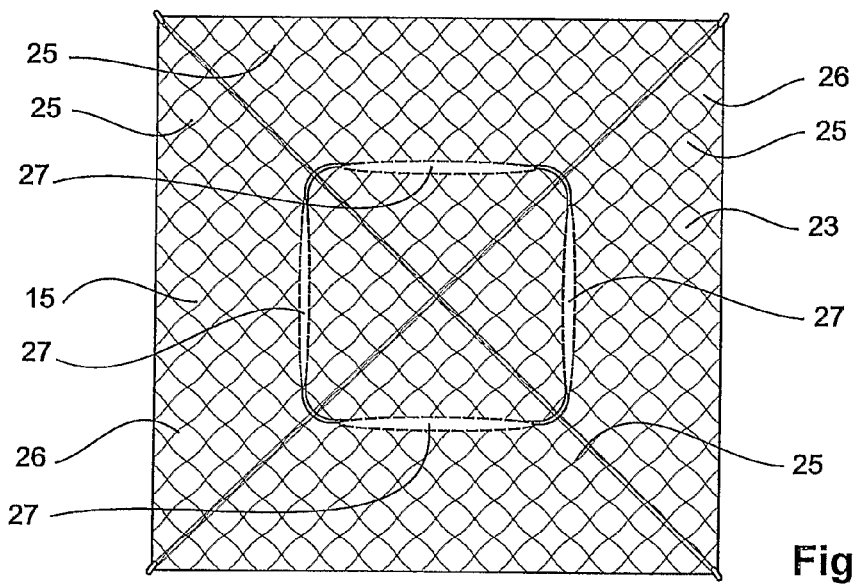
FIG. 19 is a plan view of the crab trap, illustrating the entry openings.
Figure 21:
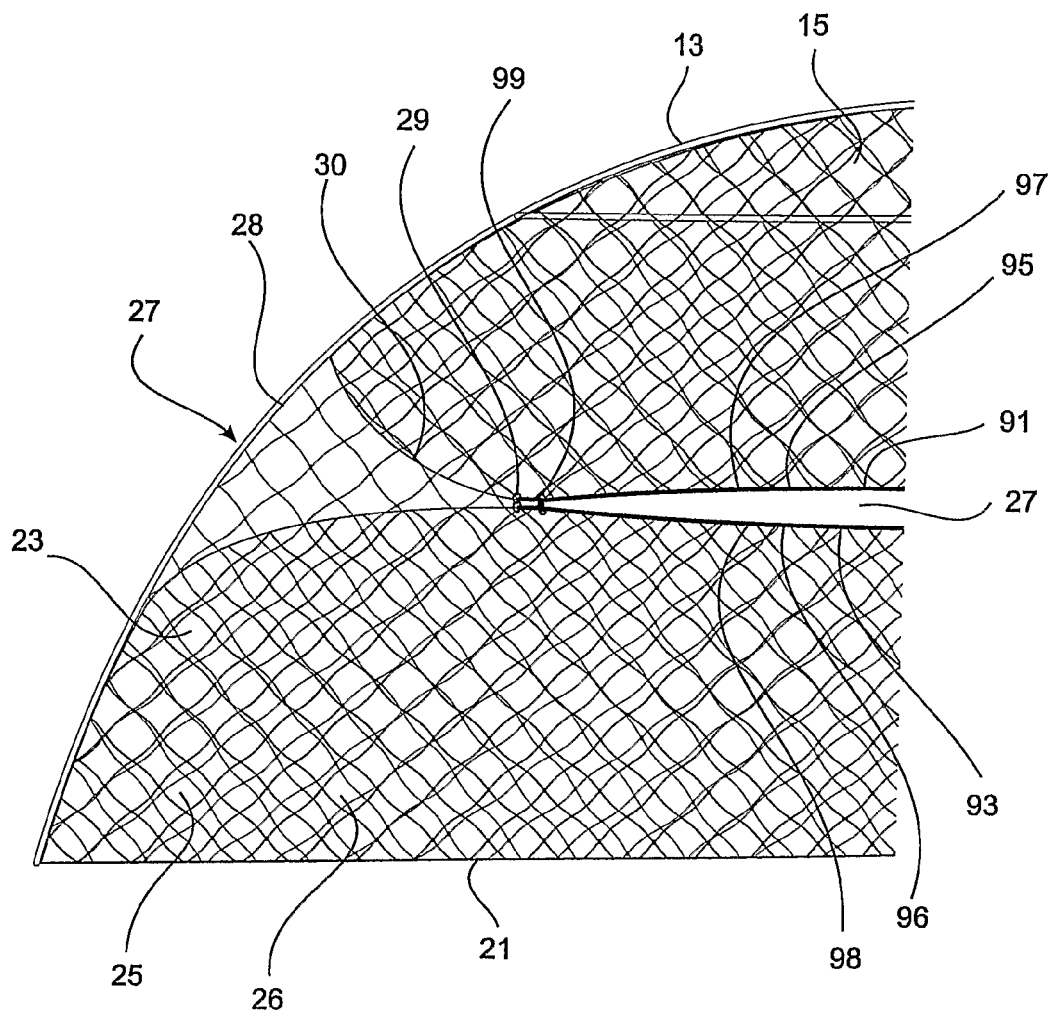
FIG. 21 is a fragmentary side view, illustrating several entry openings.
Figure 22:
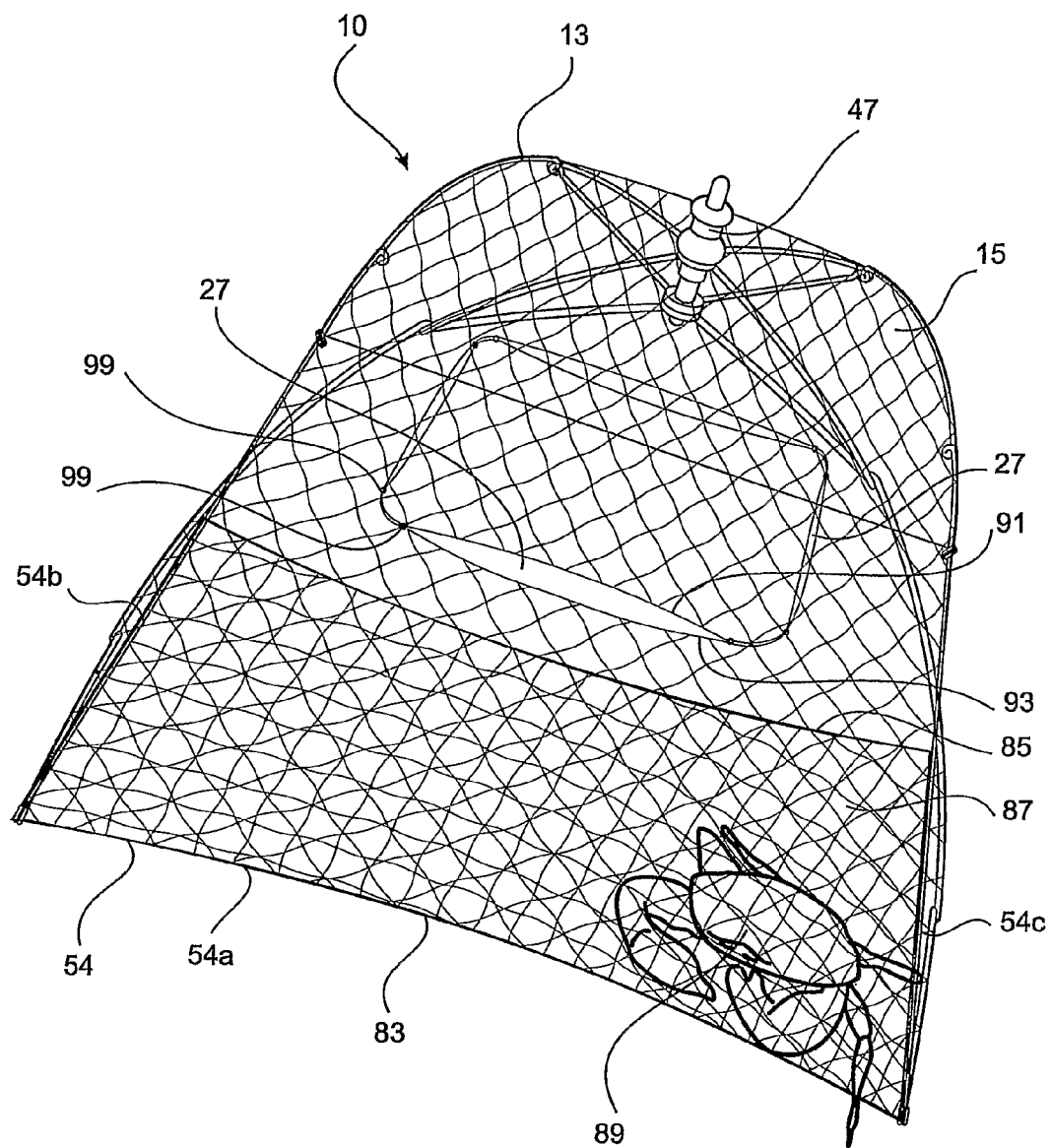
FIG. 22 is also a perspective view of the collapsible crab trap according to the first embodiment, illustrating a crab caught in the crab trap.
Figure 23:
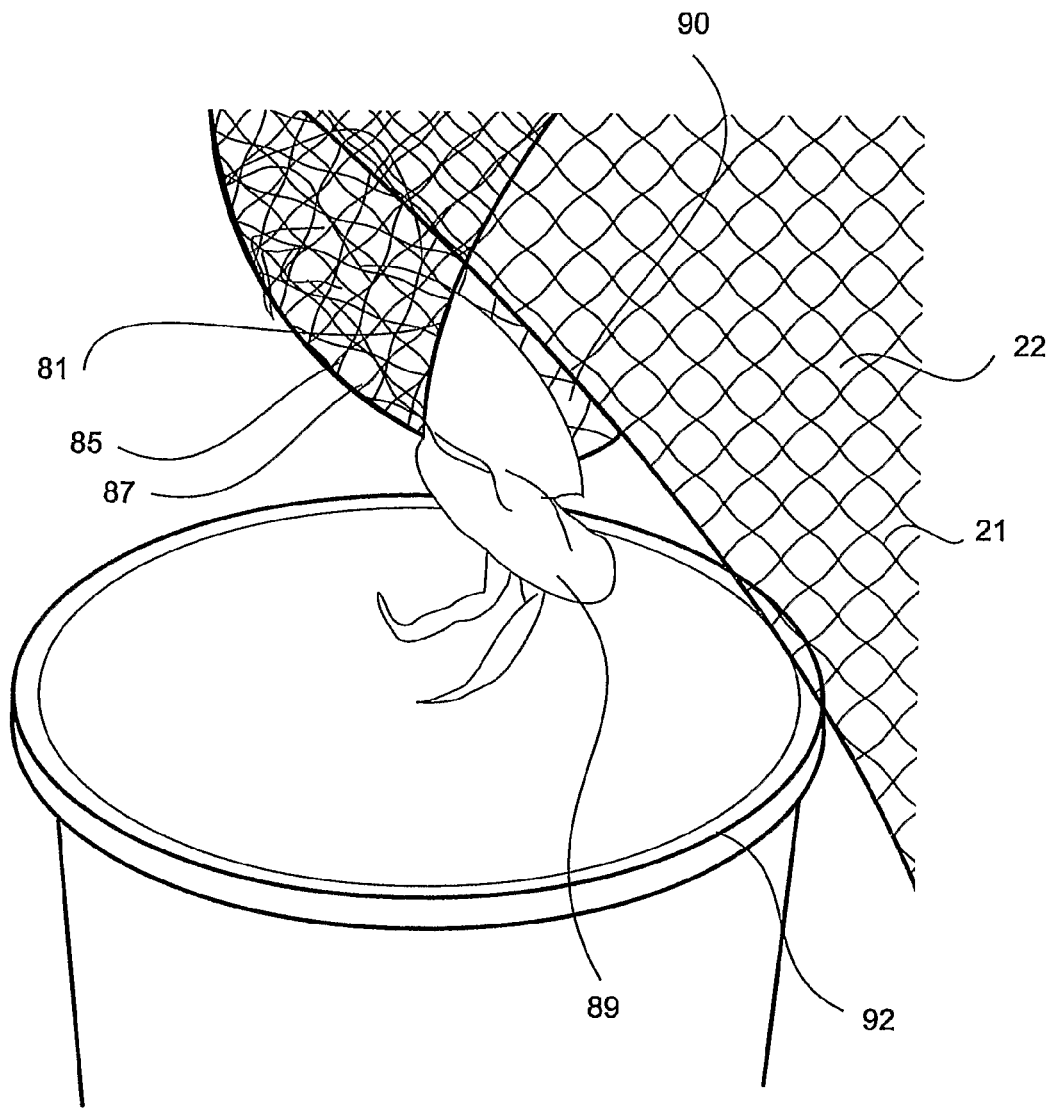
FIG. 23 is a fragmentary perspective view of the crab trap, illustrating in particular a retrieval access way for releasing a trapped crab from the trap.
Figure 24:
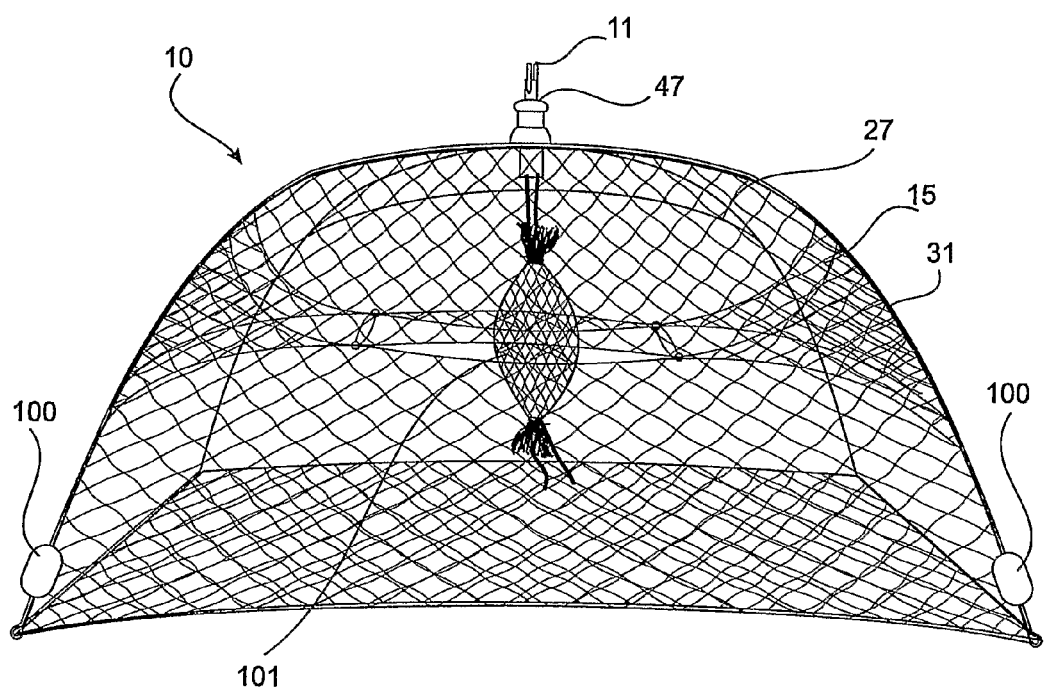
FIG. 24 is a perspective view of the crab trap according to the first embodiment, illustrating in particular a bait bag installed within the crab trap.
Figure 25:
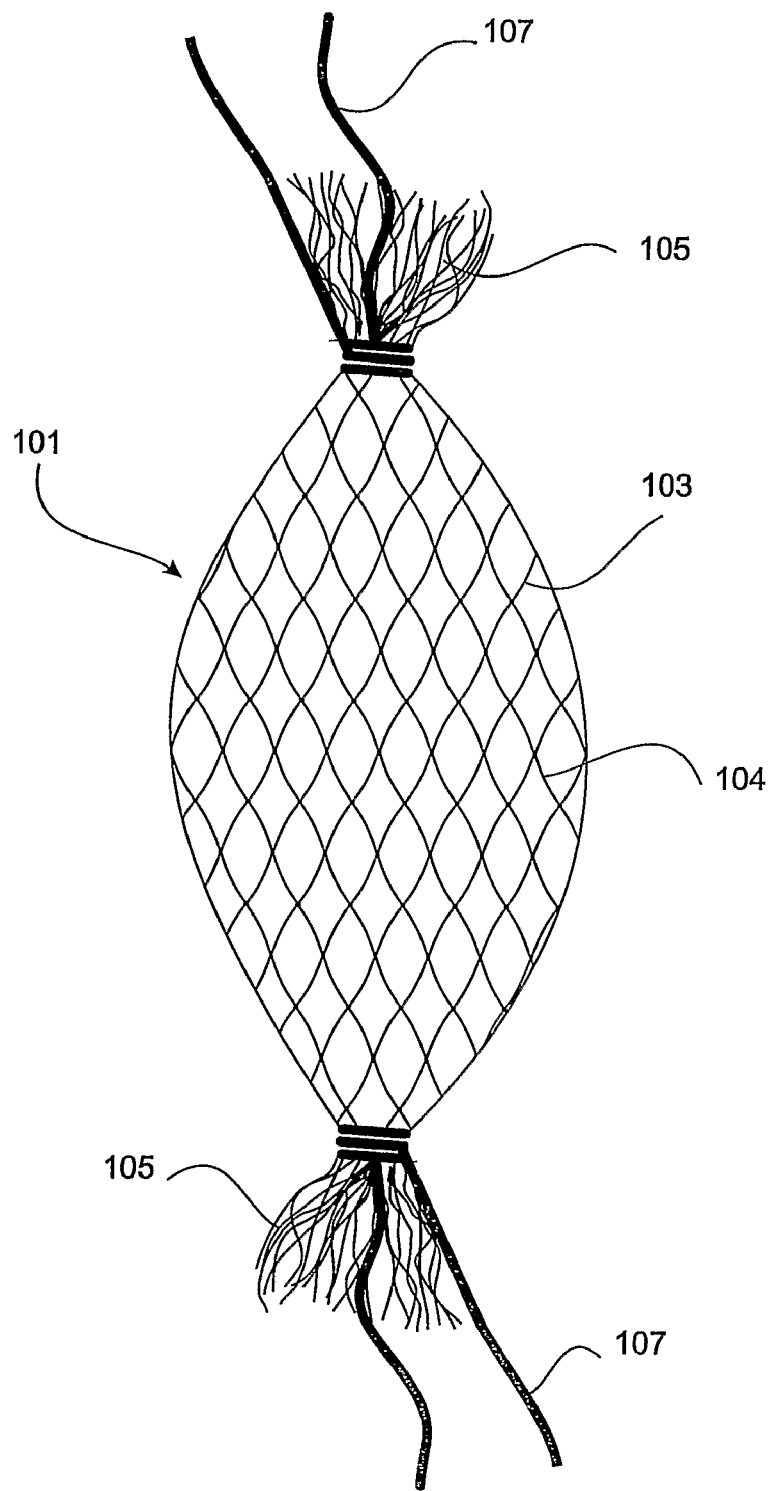
FIG. 25 is a perspective view of the bait bag.

Each entry opening 27 comprises an entry end 28 which opens onto the exterior of the enclosure 17, an exit end 29 which opens onto the entrapment zone 19 within the enclosure, and a throat section 30 which extends between the entry end 28 and the exit end 29. The exit end 29 is smaller than the entry end 28 and the throat section 30 tapers inwardly towards the exit end 29, as best seen in FIGS. 18 and 21. With this arrangement, each entry opening 27 is configured as a funnel extending into the entrapment zone 19.

Figure 20:
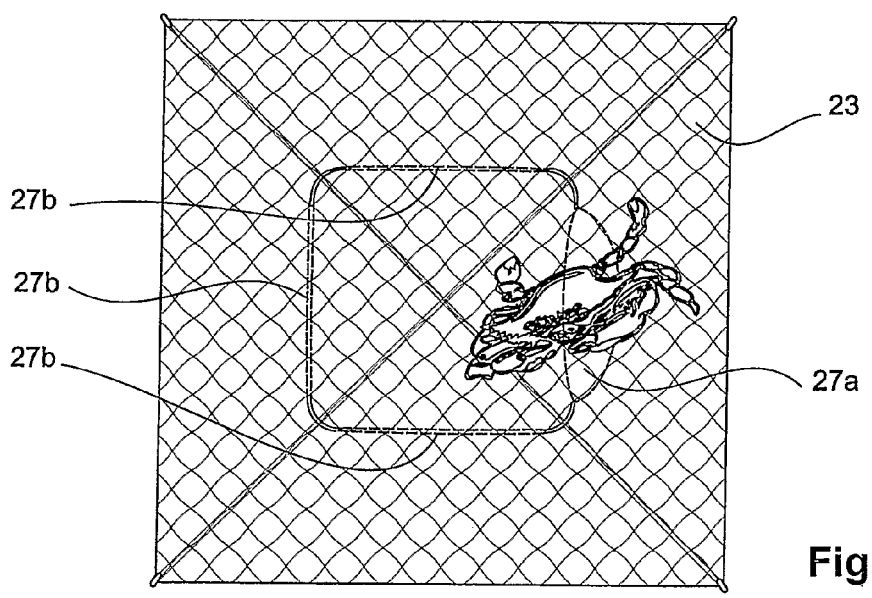
FIG. 20 is a view similar to FIG. 19, with the exception that a crab is shown entering the crab trap through one of the entry openings.

Each entry opening 27 is adapted to expand to accommodate entry of crabs of a relatively large size. This is achieve by way of two lines 91, 93 interconnecting each of the entry openings 27. Line 91 is an upper line which incorporates four loop formations 95, one extending around the periphery of each exit end 29 and interlaced with the netting about the exit end. Similarly, line 93 is a lower line which also incorporates four loop formations 96, one extending around the periphery of each exit end 29 and interlaced with the netting about the exit end. With this arrangement, each entry opening 27 is coupled to the other entry openings 27 through the two lines 91, 93. The loop formations 95, 96 allow the exit ends 29 to expand and contract according to tension applied to the lines 91, 93. In this way, any one of the entry openings 27 can be expanded by expansion of the two loop formations 95, 96 extending therearound with surplus line material required for the expansion being achieved upon corresponding contraction of loop formations around other entry openings. This is depicted in FIG. 20 where entry opening 27a is shown in an expanded condition to accommodate entry of a crab. The other entry openings 27b have contracted to accommodate expansion of opening 27a.

The tunnel configuration of each entry opening 27 is created by the constraining action of the two loop formations 95, 96 around the exit end 29 thereof. More particularly, each entry opening 27 comprises an aperture 97 in the netting 15 and the two loop formations 95, 96 interlaced with the netting 15 about the aperture. The two loop formations 95, 96 cooperate to provide a hoop 98 around the periphery of the aperture 97. When the pot 10 is in the erected condition, the lines 91, 92 are under tension, causing the hoop 98 to contract the aperture 97 and thereby cause the marginal portion of the netting 15 about the aperture to deform to assume the funnel configuration.

The lines 91, 93 are slidingly interconnected by sleeves 99 which assist in forming the hoops 98. Each sleeve 99 may comprise a knot formation in one of the lines 91, 93.

The frame structure 13 comprises a plurality of elongate frame elements 31. In this embodiment there are four elongate frame elements 31, one corresponding to each of the four corners of the enclosure 17. Each elongate frame element 31 comprises a rigid yet resiliently deflectable rod 33. In this embodiment the rod 33 is formed of metal, although it may also be formed of other appropriate materials including plastic materials.

Each rod 33 has a first end 35 configured as a bracket 36 and a second end 37 configured as an eye 38. The rod 33 also includes two intermediate twisted loop formations 41, 43. Loop formation 41 provides part of a hinge as will be explain later, and loop formation 43 provides one anchoring point for attachment of the netting 15 to the frame structure 13.

Each rod 33 is pivotally connected by way of bracket 36 at the first end 35 thereof to a common hub 45 configured as a yoke 47 having a central opening 49 extending therethrough. The yoke 47 has an outer periphery 51 configured to be gripped between the fingers and thumb of one hand of a user, as will be explained in more detail later. Further, the outer periphery 51 incorporates a circumferential groove 52 accommodating a cable 54 which provides a hinge pin passing through a hole 38 in the bracket 36.

With this arrangement, the elongate frame elements 31 are pivotally movable with respect to the yoke 47 between a retracted position in which they lie substantially along side one another generally parallel to the central axis of the frame structure 13, and an extended condition in which they extend outwardly of the central axis.

The elongate frame elements 31 are connected one to another at the second end 37 of the rods 33 by a flexible link 53 in the form of an endless steel cable 54 which is threaded through the eyes 38. With this arrangement, the flexible link 33 serves to limit the extent to which the elongate frame elements 31 can pivot outwardly and also defines the rectangular configuration of the bottom 21.

An actuating mechanism 55 is provided for pivotally moving the elongate elements 31 between the retracted and extend conditions. The actuating mechanism 55 comprises a plurality of rigid struts 57, each pivotally connected at one end to one of the elongate frame elements 31 and pivotally connected at the other end to a common hub 59. The hub 59 provides an actuating yoke 61. Each strut 57 is pivotally connected to its respective elongate frame elements 31 at the loop formation 41 provided on the elongate frame element. The strut 57 is provided with a hook formation 63 at the end thereof for engagement in the loop formation 41 to provide a hinge connection between the strut and the elongate frame element. The other end of each strut 57 is configured as a bracket 65 incorporating a hole through which a cable 67 is threaded to hingedly secure the strut to the yoke 61. The cable 67 is accommodated in a peripheral groove 69 in the yoke 61.

In the operational orientation of the crab pot 10 when in the erected condition, the supporting yoke 47 is above the actuating yoke 61.

The actuating yoke 61 is provided with an upstanding post 71, the free upper end of which incorporates and anchoring hole 73 to which the bottom end of the haul line 11 is attached. In approaching the (bottom) actuating yoke 61, the haul line 11 passes through the central opening 49 in the (upper) supporting yoke 47. The central opening 49 provides a clearance fit of the supporting yoke 47 on the haul line 11, whereby the yoke 47 can slide axially along the haul line. With this arrangement, sliding movement of the supporting yoke 47 along the haul line 11 causes the frame structure 13 to move between the extended condition and the retracted condition. Specifically, sliding movement of the supporting yoke 47 towards to the actuating yoke 61 causes the frame structure 13 to move from the retracted position to the extended condition. Similarly, the sliding movement of the (upper) supporting yoke 47 in the direction away from the (lower) actuating yoke 61 causes the frame structure 13 to move from the extended condition to the retracted condition. As the frame structure 13 moves from the retracted condition to the extended condition, the struts 57 pass through an "over-centre" position so as to bias the frame structure into the extended condition.

Figure 11:
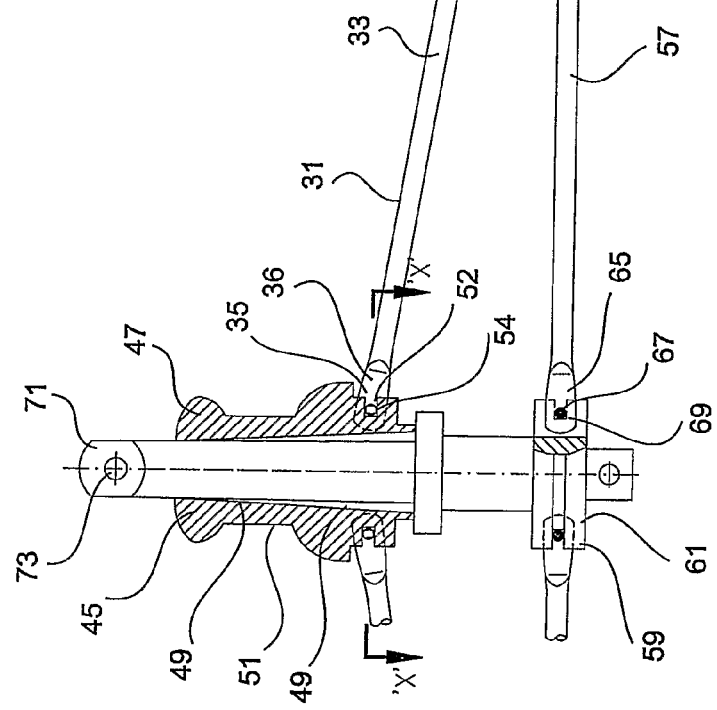
FIG. 11 is a fragmentary view of part of the frame structure.
Figure 12:
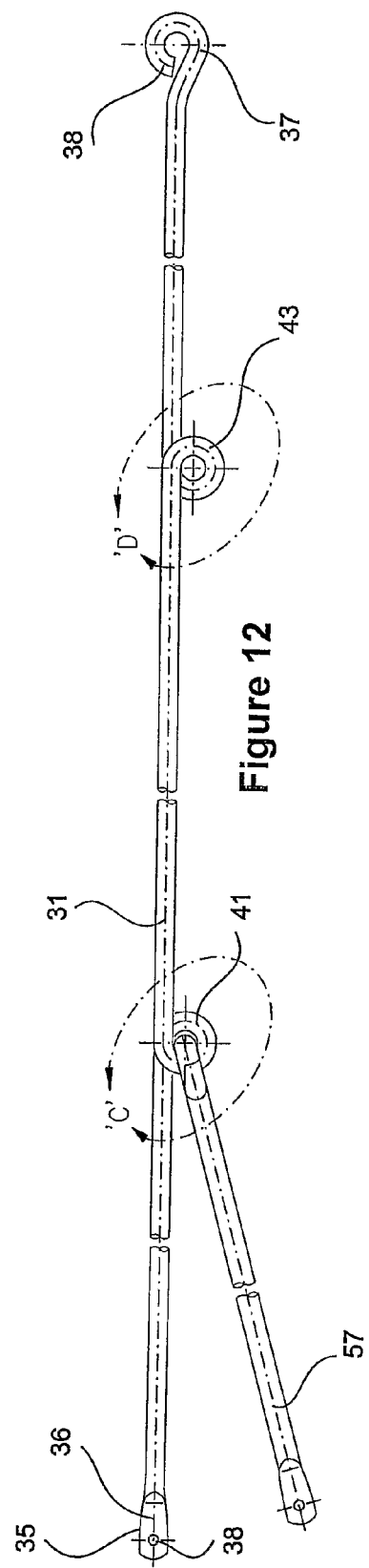
FIG. 12 is an elevational view of an elongate frame element forming part of the frame structure and strut connected thereto.
Figure 13:
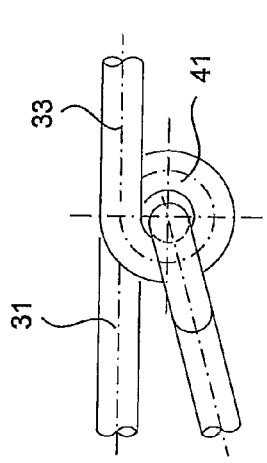
FIG. 13 is an enlarged view of a pivotal connection between the elongate frame element and the strut.
Figure 14:
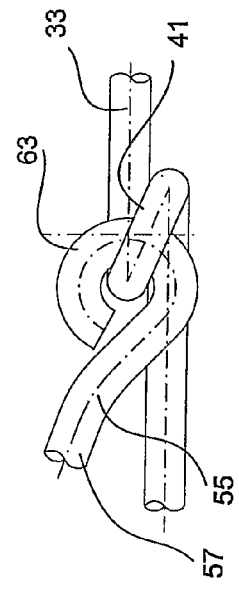
FIG. 14 is a plan view of FIG. 13.
Figure 15:
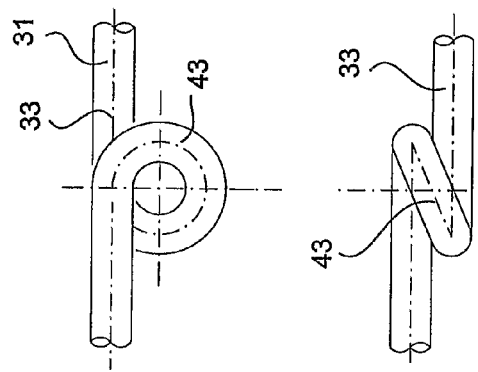
FIG. 15 is view of an eye formation in the elongate element.
Figure 16:
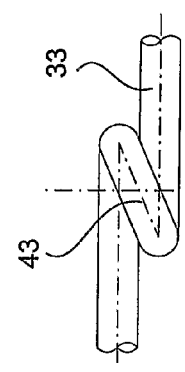
FIG. 16 is a plan view of the eye-formation of FIG. 15.
Figure 17:
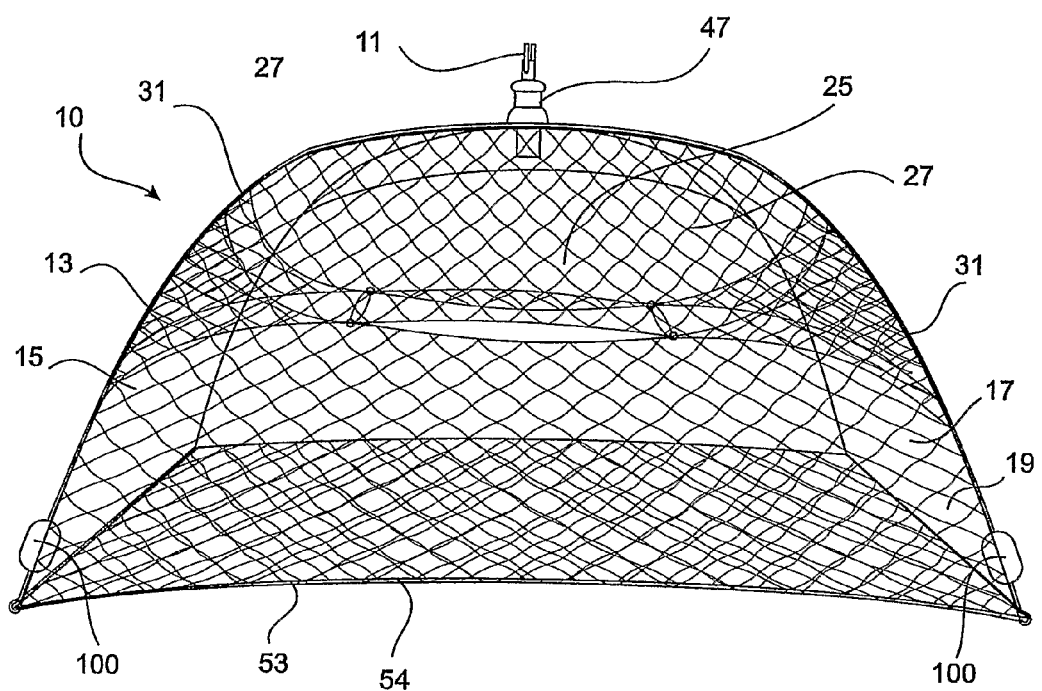
FIG. 17 is a view of the collapsible crab pot in the erected condition, illustrating in particular entry openings in the sides thereof.

The post 71 has a portion thereof configured as a spigot 75, and the central opening 49 in the supporting yoke 47 has a portion thereof configured as a socket 77 for matingly receiving the spigot 75 when the frame structure 13 is in the extended condition, as best seen in FIG. 11 of the drawings. The spigot 75 and the socket 77 are configured to resist rotation therebetween when the mating engagement, thereby providing rigidity to the frame structure 13 when in the extended condition. This is achieved by providing splines 78 on the spigot 75 and mating keyways 79 in the socket 77 for receiving the splines when the spigot is matingly received within the socket.

The crab pot 10 is provided with a retrieval access way 81 for retrieval of a crab trapped in the enclosure 17. The retrieval access way 81 comprises an opening 83 in the bottom 21 of the enclosure 17. The opening 83 is defined by a gap between one side of the bottom 21 and the adjacent section 54a of the cable 54 providing the flexible link 53. The bottom 21 is defined by the rectangular mesh panel 22 positioned within the area bounded by the cable 54. The rectangular mesh panel 22 is attached on three of its four sides to the cable in any suitable manner, such as by binding. The rectangular mesh panel 22 is not attached to the section 54a of the cable 54 on its fourth side, thereby providing a gap between the mesh panel 22 and the adjacent section 54a of cable which constitutes the opening 83.

The retrieval access way 81 further comprises a closure flap 85 located on the underside of the bottom 21 against the opening 83. The closure flap 85 comprises a rectangular mesh panel 87 which is attached to the section 54a of the cable 54 adjacent the opening 83 and also to the two neighbouring cable sections 54b, 54c, the attachment being achieved in any suitable way such as binding. With this arrangement, the closure flap 85 underlies the opening 83 and serves to provide a closure for it while also providing a retrieval path between the bottom 21 and the closure flap 85 accessible by way of the opening 83.

Figure 26:
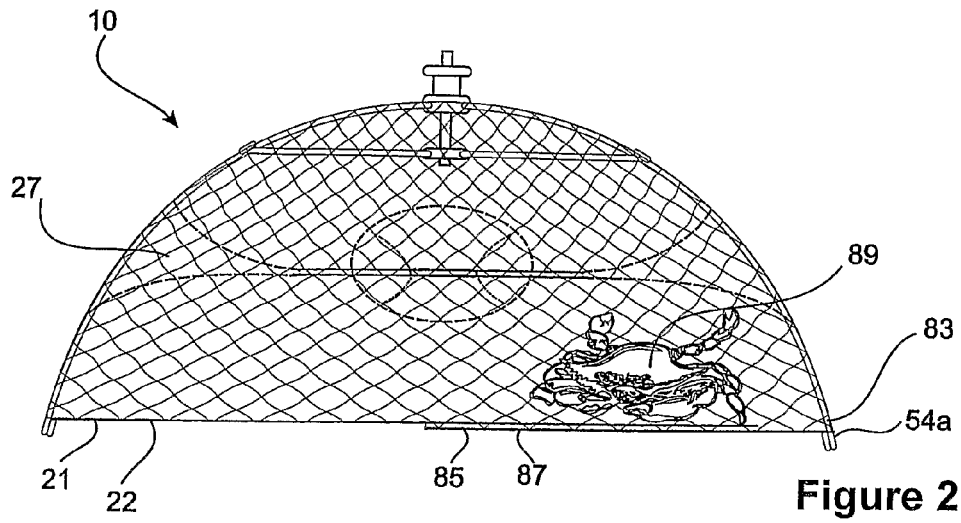
FIGS. 26, 27 and 28 are schematic side views illustrating retrieval of a trapped crab.

When a crab 89 is trapped within the enclosure 17, the weight of the crab on the bottom 21 serves to urge the section of the bottom 21 adjacent the opening 83 into contact with the underlying closure flap 85, thereby ensuring that the opening 83 is closed so that the retrieval path is not accessible to the trapped crab (as shown in FIG. 26).

Figure 27:
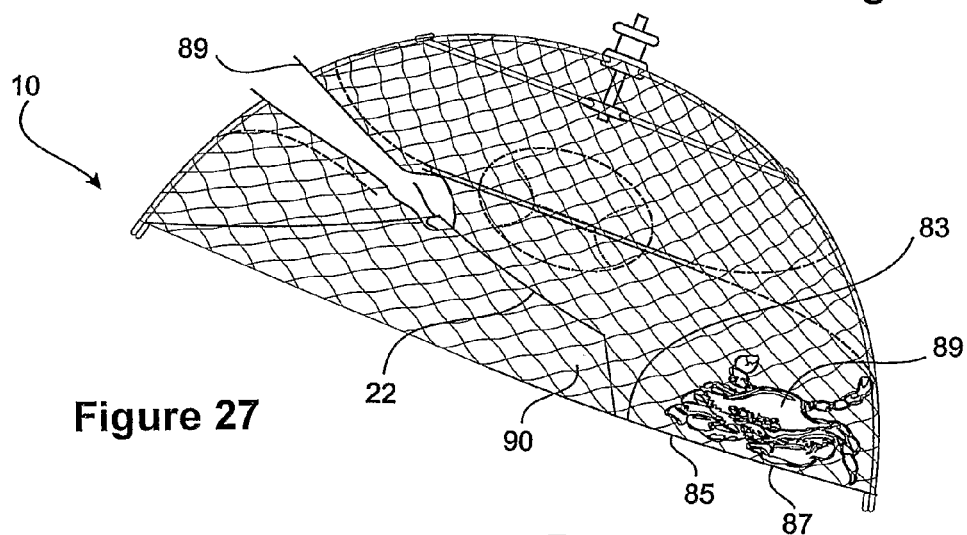
Figure 28:
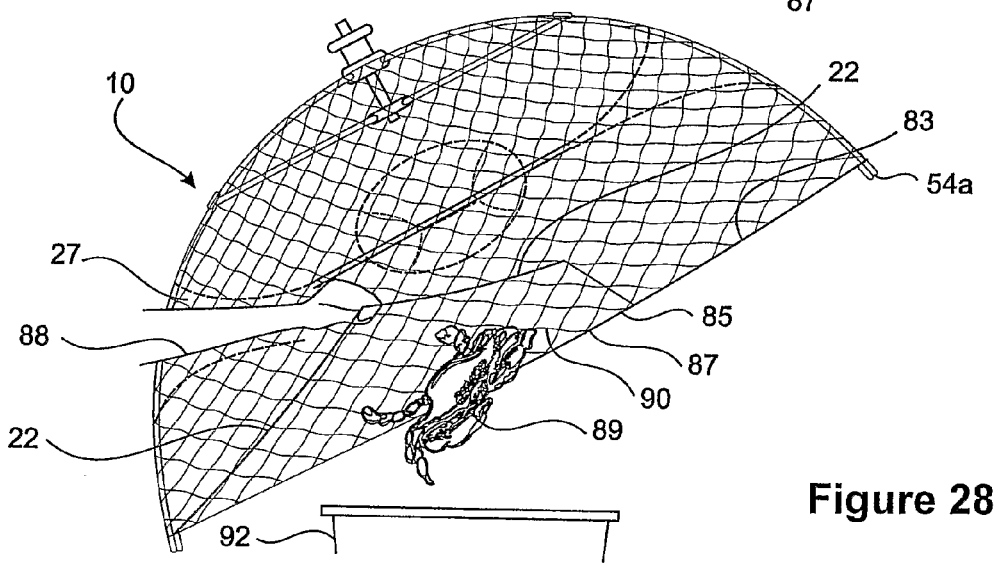

When it is desired to retrieve the trapped crab 89 from the enclosure 17, a user inserts his or her hand 88 into the enclosure through the particular entry opening 27 on the side of the pot opposite the opening 83, and pulls the mesh netting 22 defining the bottom 21 away from the mesh panel 87 defining the closure flap 85 (as shown in FIG. 27) to expand the opening 83 and thereby create a space 90 through which the crab can pass to exit from the enclosure 17. It has been found that the trapped crab 89 will instinctively move towards and through the opening 83 when the bottom mesh 22 is lifted away from the closure flap 85. By appropriately tilting the pot 10, the trapped crab 89 can be induced to pass along the space 90 between the raised mesh netting 22 and the underlying mesh panel 87, and then fall from the pot (as shown in FIG. 28). Typically, the retrieval process would be conducted above a container 92, such as a bucket, into which the trapped crab 89 would fall upon exiting from the enclosure 17 through the retrieval access way 81.

The frame structure 13 may be fitted with weights 100 to ensure that it sinks in the body of water. The weights 100 may be changed according to negative buoyancy requirements.

The crab pot 10 may have provision to accommodate a bait for attracting crabs into the enclosure 17. In this embodiment, the bait is contained within a bait bag 101 adapted to be suspended within the enclosure 17. The bait bag 101 is configured as a wrapper 103 within which the bait is confined. The wrapper 103 comprises several sheet layers of mesh material 104 wrapped about the bait and twisted at opposed ends 105 in a manner similar to a confectionery wrapper. Ties 107 are attached to a twisted ends of the wrapper 103 for the purposes of suspending the bait bag within the enclosure 17. Typically, one tie 107 would be attached to the underside of the (bottom) actuating yoke 61 and the other tie would be attached to the mesh panel 22 defining the bottom 21 of the enclosure.

The crab pot 10 according to the first embodiment is of a simple yet highly effective construction which can be readily transformed between the erected and collapsed conditions. When the crab pot 10 is in the collapsed condition, the elongate frame elements 31 of the frame structure 31 are retracted so as to be disposed generally along side one another adjacent the central axis of the pot, and netting 15 draping from the retracted frame structure 13 is wrapped therearound as best seen in FIG. 2 of the drawings. This provides a particularly compact condition for the collapsed crab pot 10, facilitating storage and transportation. When it is desired to use the crab pot 10, it is merely necessary to unwrap the netting 15 from the retracted frame structure 13 and then move the frame structure into the extended position. This is simply done by gripping the outer portion 51 of the (upper) supporting yoke 47 and pulling the haul line 11. This causes the yoke 47 to slide along the haul line 11 in the direction towards the (lower) actuating yoke 61. Interaction between the struts 57 and the rods 33 cause the elongate frame elements 31 to pivot outwardly towards the extended condition. As the elongate elements 31 pivot outwardly, the cable 54 defining the flexible link 53 at the free ends of the rods 33 tensions to assume a generally rectangular configuration. Continued outward movement of the struts 57 causes the rods 33 to deflect as previously described in order to make the enclosure sides to assume a domed profile, as illustrated in the drawings. As the frame structure 13 approaches its fully extended condition, the spigot 75 on the (lower) actuating yoke 61 matingly engages with the socket 77 in the (upper) supporting yoke 47. This provides a rigid yet releasable connection between the two yokes 47, 61, thereby providing stability to the frame structure 13 when in the extended position.

Once the crab pot 10 is in the erected condition, it can be used in the conventional way, with crabs entering the enclosure 17 through the entry openings 27 as previously described. The present embodiment has a particular advantage in that there are for entry openings 27, thereby increasing the possibility of a successful catch.

The pot 10 is retrieved from the water in the usual way; that is, by hauling it to the surface by the way of haul line 11. Any captured crabs are retrieved from the enclosure 17 by way of the retrieval access way 81, as previously described.

When the crabbing activity has been completed, the erected crab pot 10 can be collapsed simply by pulling the two yokes 47, 61 apart so as to allow the frame structure 13 to return to the retracted condition. Draping netting 15 can then be wrapped around the retracted frame structure 13 to complete the collapsing process.

Figure 29:
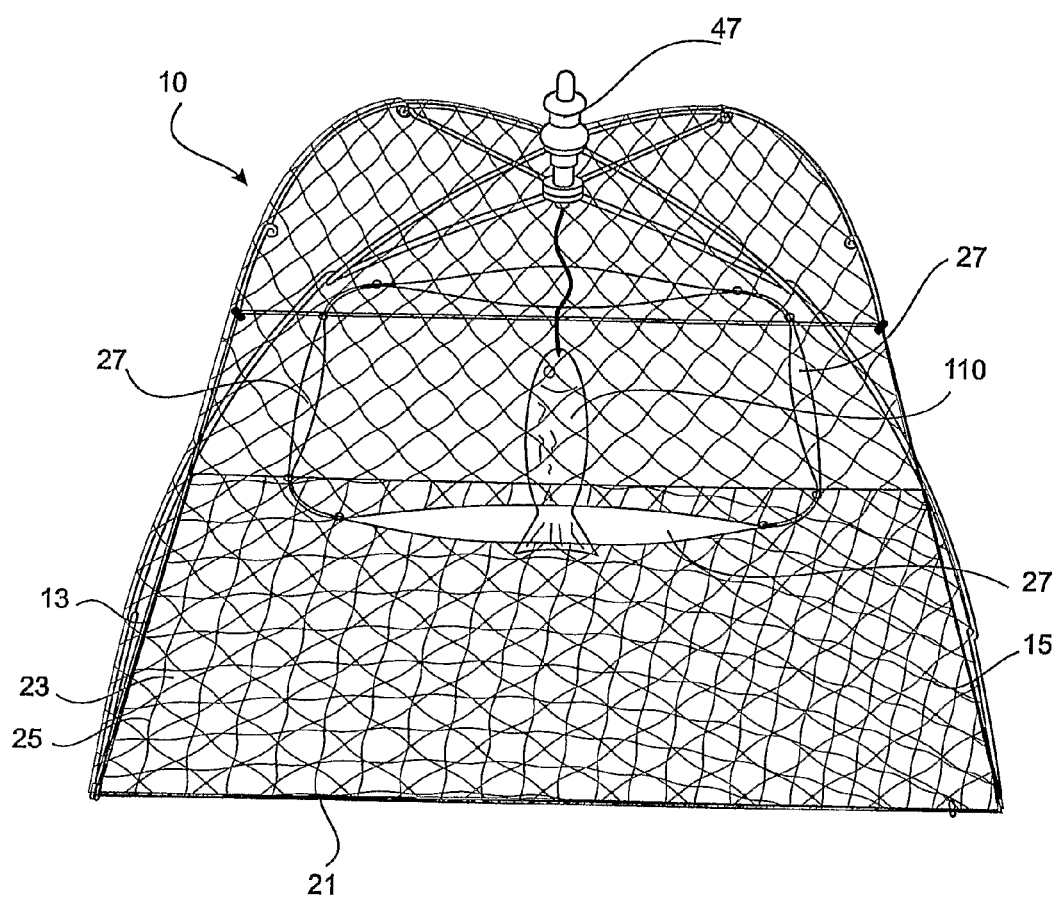
FIG. 29 is a view similar to FIG. 24, with exception that a lure is used within the trap rather than a bait bag.

In the embodiment described previously, bait was confined in a bait bag 101. Other arrangements are, of course, possible. FIG. 29 illustrates an arrangement where the bait 110 is on a skewer installed in the enclosure 17 for the purposes for attracting crabs.

Figure 30:
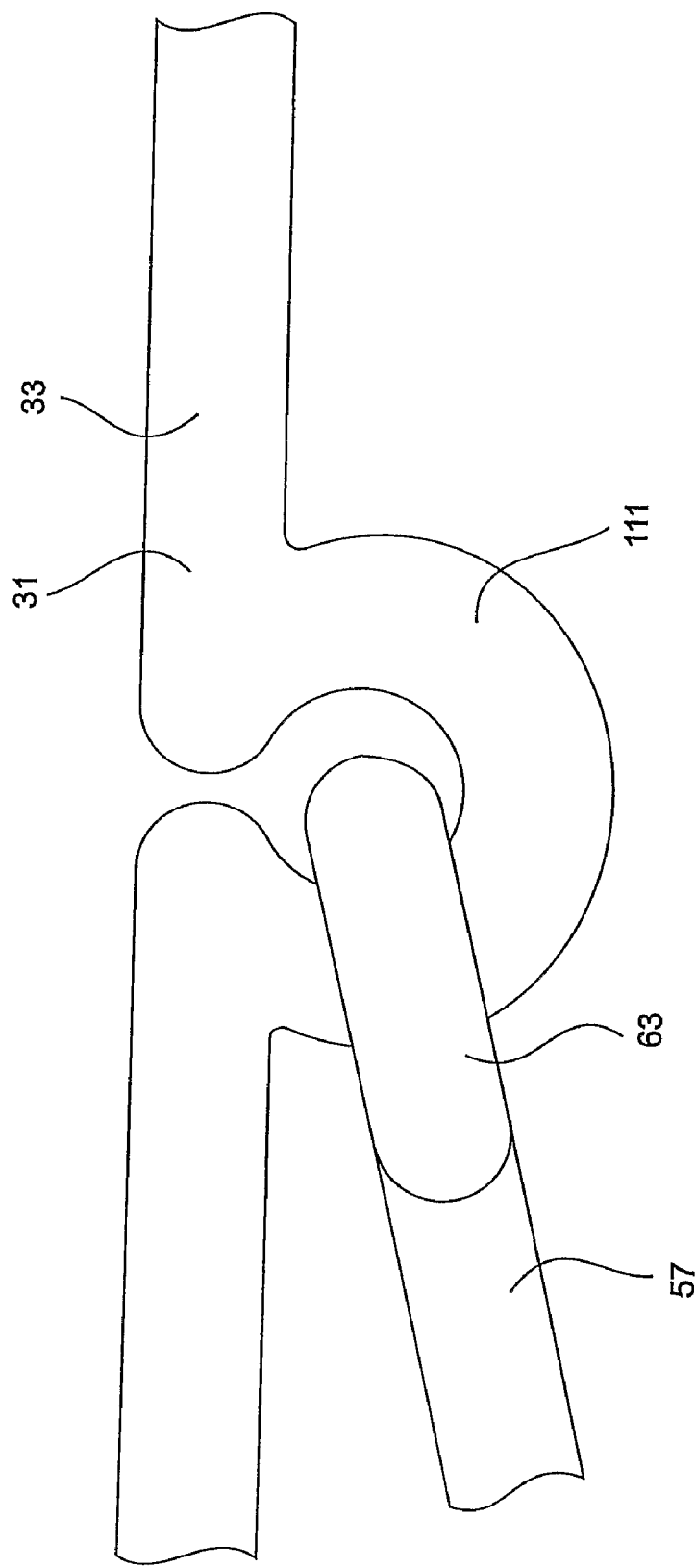
FIG. 30 is a fragmentary view of an alternative construction of eye formation in each elongate element.

In the first embodiment, the rods 33 incorporate closed (twisted) loop formations 41, 43. Rather than providing connections by way of closed loop formations, other formations can be incorporated into the rod, one example is one of which is an open loop formation 111 as illustrated at FIG. 30.

Figure 31:
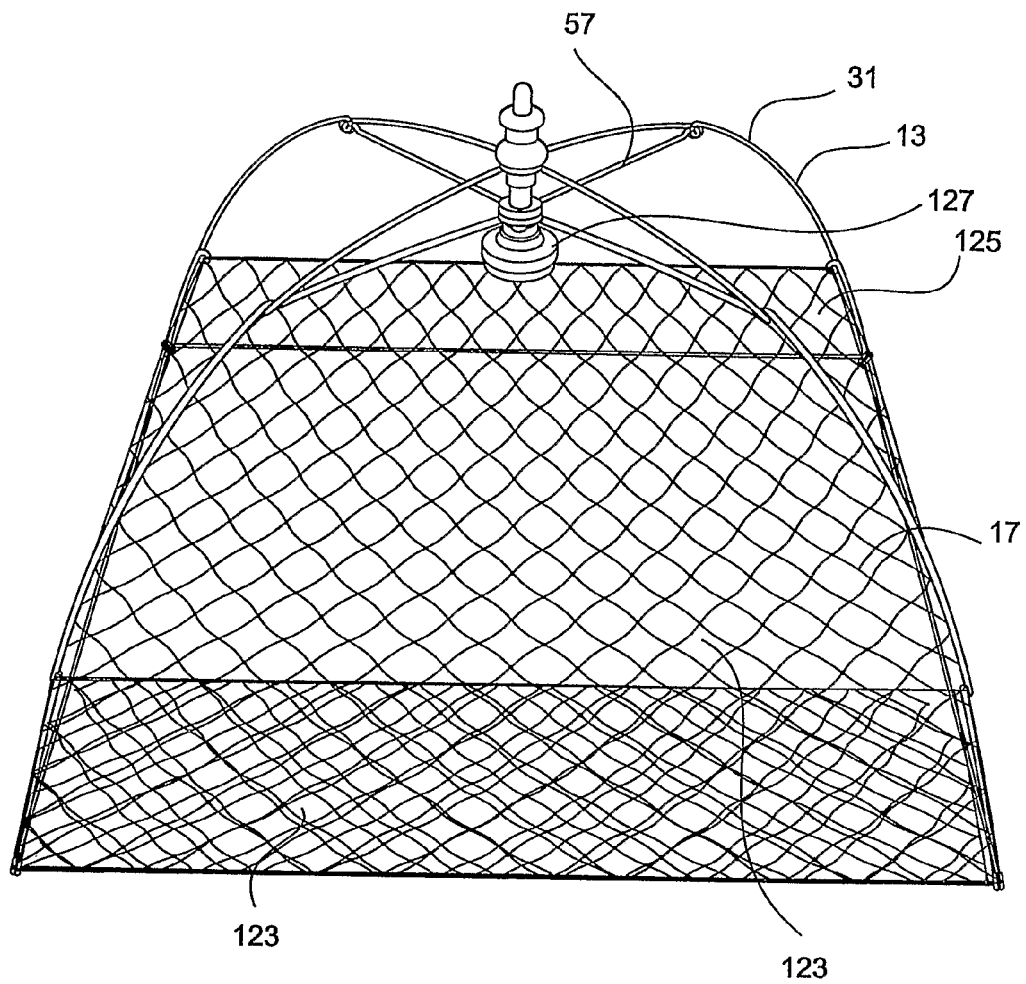
FIG. 31 is a perspective view of crab trap according to a second embodiment, in which the enclosure is configured as a pen.

In the first embodiment, the enclosure 17 is configured as a cage. The may be circumstances where there is a need for a crab pot in which the enclosure is open at the top to provide a pen. Such an arrangement is incorporated in the embodiment illustrated in FIG. 31. In this embodiment, the enclosure 17 comprises a bottom wall 121, side walls 123 upstanding from the bottom wall and an open top 125. The crab pot according to this embodiment is of a similar construction to the first embodiment apart for the nature of the enclosure, and so corresponding reference numerals are used to identify similar parts. In this embodiment, the pot incorporates an electronically powered light 127 mounted on the lower yoke 61.

Figure 32:
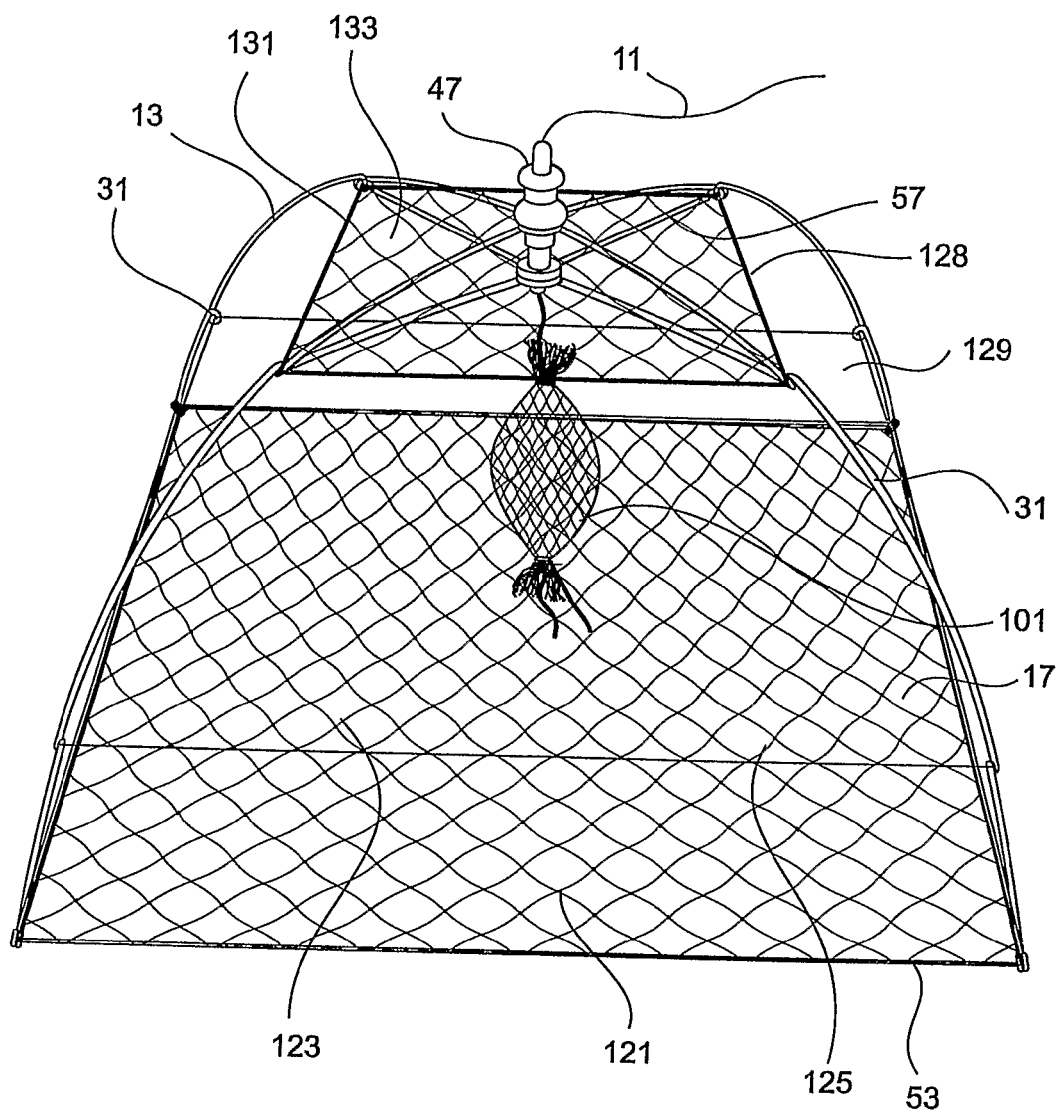
FIG. 32 is a perspective view of a crab trap according to a third embodiment, in which the enclosure is also configured as a pen.

FIG. 32 of the drawings shows an embodiment somewhat similar to the previous embodiment in the sense that the enclosure 17 is configured as a pen. However, in this embodiment there is a top wall 128, and the side walls 123 terminates short of the top wall 128 to provide side openings 129. The top wall 128 comprises a peripheral cable 131 extending between the frame elements 31 of the frame structure 13 and a mesh panel 133 within the peripheral cable. The top wall 128 ensures that crabs must enter the enclosure 17 in order to gain access to the bait 101.

From the foregoing, it is evident that the present embodiments each provide a simple yet highly effective crab pot which can assume a compact condition and which can be readily erected into a operational condition for trapping crabs.

It should be appreciated that the scope of the invention is not limited to the scope of the embodiments described.

While the embodiments have been described in relation to traps for crabs, it should be understood that the invention may have application to trapping other crustaceans (such as lobsters and crayfish) and perhaps also other animals (not necessarily in marine environments).

Throughout the specification, unless the context requires otherwise, the word "comprise" or variations such as "comprises" or "comprising", will be understood to imply the inclusion of a stated integer or group of integers but not the exclusion of any other integer or group of integers.

I claim:

1. A collapsible trap comprising a frame structure having an axis, and a pliant material associated with the frame structure, the frame structure comprising a plurality of elongate frame elements, the frame structure having a retracted condition in which the frame elements extend generally parallel to said axis and an extended condition in which the frame elements extend outwardly of the axis giving form and shape to the pliant material to provide an enclosure defining an entrapment zone, and a retrieval access way for retrieval of an animal trapped in the enclosure, the retrieval access way comprising an opening in a bottom of the enclosure and a closure flap located against the opening, whereby a retrieval path can be formed upon separation of the bottom and the flap, the opening is defined by a gap between one side of the bottom and an adjacent section of a cable providing a flexible link, the bottom is defined by a rectangular mesh panel positioned within an area bounded by the cable, the rectangular mesh panel is attached on three of its four sides to the cable, the rectangular mesh panel is not attached to the adjacent section of the cable on its fourth side, thereby providing said gap between the rectangular mesh panel and the adjacent section of the cable, the retrieval access way comprises the closure flap located on an underside of the bottom against the opening, the closure flap comprises a second rectangular mesh panel which is attached to the adjacent section of the cable adjacent the opening and also to two neighbouring cable sections that neighbor the adjacent section of the cable; and wherein the rectangular mesh panel of the bottom is maintained in contact with the closure flap under weight of the animal trapped, thereby ensuring the opening is closed and the retrieval path is inaccessible to the animal trapped.

2. A collapsible trap according to claim 1, wherein portions of the pliant material draping from the frame structure when the frame structure is in the retracted condition can be wrapped about the frame structure, around said axis to assume a compact condition for storage and transportation, and wherein the pliant material is extended to define the entrapment zone when the frame structure is in the extended condition.

3. A collapsible trap according to claim 1 or 2 wherein the enclosure is configured as a pen having the bottom, the pliant material and the frame structure forming a wall means upstanding from the bottom and an open top.

4. A collapsible trap according to claim 1 wherein the enclosure is configured as a cage having the bottom and the pliant material and the frame structure forming a wall means upstanding from the bottom to enclose all sides and a top of the entrapment zone.

5. A collapsible trap according to claim 4 wherein the wall means of the enclosure comprises the pliant material as sections of mesh attached between the elongate frame elements.

6. A collapsible trap according to claim 1 wherein the pliant material comprises netting.

7. A collapsible trap according to claim 1 wherein the elongate frame elements are pivotally moveable between the retracted and extended conditions.

8. A collapsible trap according to claim 7 wherein the frame elements are each mounted at a first end thereof for pivotal movement and are connected one to another by the cable providing flexible links at a location spaced from the first end thereof.

9. A collapsible trap according to claim 8 wherein the frame elements are connected one to another by the cable providing flexible links at second ends of the frame elements opposed to the first ends of the frame elements.

10. A collapsible trap according to claim 8 or 9 wherein the cable providing flexible links comprises an inextensible cable.

11. A collapsible trap according to claim 8 wherein an actuating mechanism is provided for pivotally moving the elongate frame elements between the retracted and extended conditions and wherein the actuating mechanism comprises a plurality of struts each connected to one of the elongate frame elements at a location intermediate the first end and the cable providing flexible links.

12. A collapsible trap according to claim 11 wherein each strut is pivotally connected at one end thereof to its respective frame element and is pivotally connected at the other end thereof to adjacent ends of other struts.

13. A collapsible trap according to claim 12 wherein each strut is pivotally connected at said other end to a common element comprising a hub functioning as an actuating yoke.

14. A collapsible trap according to claim 1 wherein an actuating mechanism is provided for pivotally moving the elongate frame elements between the retracted and extended conditions.

15. A collapsible trap according to claim 14 wherein a first end of each of the elongate frame elements are pivotally connected together.

16. A collapsible trap according to claim 15 wherein the first ends of the frame elements are pivotally connected to a common element comprising a hub functioning as a supporting yoke.

17. A collapsible trap according to claim 16 wherein the actuating mechanism further comprises a haul line which is connected to an actuating yoke and on which the supporting yoke is slidably supported, whereby sliding movement of the supporting yoke along the haul line causes the frame structure to move between the extended condition and the retracted condition.

18. A collapsible trap according to claim 17 wherein the actuating yoke incorporates a spigot which is adapted to be received in a mating socket in the supporting yoke when the frame structure is in the extended condition.

19. A collapsible trap according to claim 18 wherein the socket and spigot are configured to resist rotation therebetween when in mating engagement.

20. A collapsible trap according to claim 1 wherein the enclosure is configured as a cage and wherein there is provided at least one entry opening for entry of a target animal into the entrapment zone.

21. A collapsible trap according to claim 20 wherein the cage has four sides and wherein there is one entry opening in each one of the four sides.

22. A collapsible trap according to claim 20 wherein the at least one entry opening comprises an entry end which opens onto an exterior of the enclosure, an exit end which opens onto the entrapment zone, and a throat section which extends between the entry and exit ends.

23. A collapsible trap according to claim 22 wherein the exit end is smaller than the entry end and the throat section tapers inwardly towards the exit end.

24. A collapsible trap according to claim 23 wherein the at least one entry opening comprises an aperture in the pliant material and a hoop about the aperture, the hoop being adapted to contract the aperture resulting in a contracted aperture when the frame structure is in the extended condition thereby to cause a marginal portion of the pliant material about the aperture to deform to provide the throat section, the contracted aperture providing the exit end of the at least one entry opening.

25. A collapsible trap according to claim 24 wherein each hoop comprises a loop formation in a line extending between at least two entry openings, the loop formation being capable of expansion and contraction upon movement of the line.

26. A collapsible trap according to claim 25 wherein each hoop comprises a further loop formation in a further line extending between said at least two entry openings, the loop formation being capable of expansion and contraction upon movement of the line.

27. A collapsible trap according to claim 25 or 26 wherein the pliant material comprises netting and each loop formation is interlaced with the netting about the aperture.

28. A collapsible trap comprising a frame structure having an axis, and pliant material associated with the frame structure, the frame structure comprising a plurality of elongate frame elements, the frame structure having a retracted condition in which the frame elements extend generally parallel to said axis and an extended condition in which the frame elements extend outwardly of the axis giving form and shape to the pliant material to provide an enclosure defining an entrapment zone, an actuating mechanism for pivotally moving the elongate frame elements between the retracted and extended conditions, the actuating mechanism comprising an actuating hub to which the plurality of frame elements are connected for pivotal movement between the extended and retracted conditions, an actuating member operably connected to the frame elements, and a haul line extending through an opening in the actuating hub and being connected to the actuating member, whereby sliding movement of the actuating hub with respect to the haul line causes the frame structure to move between the extended condition and the retracted condition, the collapsible trap further comprising a retrieval access way for retrieval of an animal trapped in the enclosure, the retrieval access way comprising an opening in a bottom of the enclosure and a closure flap located against the opening, whereby a retrieval path can be formed upon separation of the bottom and the flap, the opening is defined by a gap between one side of the bottom and an adjacent section of a cable providing a flexible link, the bottom is defined by a rectangular mesh panel positioned within an area bounded by the cable, the rectangular mesh panel is attached on three of its four sides to the cable, the rectangular mesh panel is not attached to the adjacent section of the cable on its fourth side, thereby providing said gap between the rectangular mesh panel and the adjacent section of the cable, the retrieval access way comprises the closure flap located on an underside of the bottom against the opening, the closure flap comprises a second rectangular mesh panel which is attached to the adjacent section of the cable adjacent the opening and also to two neighbouring cable sections that neighbor the adjacent section of the cable; and wherein the rectangular mesh panel of the bottom is maintained in contact with the closure flap under weight of the animal trapped, thereby ensuring the opening is closed and the retrieval path is inaccessible to the animal trapped.

29. A collapsible trap according to claim 28 wherein the actuating member is operably connected to the frame elements by a plurality of struts each pivotally connected between the actuating member and a respective one of the frame elements.

30. A collapsible trap according to claim 29 wherein each frame element incorporates a twisted loop formation and the respective strut has an end thereof configured for engagement with the loop formation to provide a hinge pivotally connecting the frame element and the strut.

31. A collapsible trap according to claim 30 wherein the end of the respective strut is configured as a hook formation for engagement with the loop formation.

32. A collapsible trap according to claim 28 wherein the actuating member incorporates a spigot which is adapted to be received in a mating socket in the actuating hub when the frame structure is in the extended condition.

33. A collapsible trap according to claim 32 wherein the socket and spigot are configured to resist rotation therebetween when in mating engagement.

34. A collapsible trap according to claim 33 wherein the socket has at least one keyway and the spigot has at least one spline adapted to be matingly received in the at least one keyway to resist rotation between the socket and the spigot.

35. A collapsible trap according to claim 34 wherein the at least one keyway and mating spline are of tapered configuration for frictional engagement therebetween.

36. A collapsible trap according to claim 32 wherein the haul line extends through the socket in the hub and is connected to a free end portion of the spigot.

37. A collapsible trap according to claim 28 wherein the hub has a portion thereof configured to be gripped by a user.

38. A collapsible trap according to claim 28 wherein the hub has an outer periphery incorporating a circumferential groove accommodating a second cable defining a hinge pin for pivotally connecting the frame elements to the hub.

39. A collapsible trap comprising a frame structure, and a pliant material associated with the frame structure, the frame structure comprising a plurality of elongate frame elements, the frame structure having a retracted condition and an extended condition giving form and shape to the pliant material to provide an enclosure defining an entrapment zone, an actuating mechanism for pivotally moving the elongate frame elements between the retracted and extended conditions, the actuating mechanism comprising a plurality of struts each pivotally connected to a respective one of the frame elements at a hinge, each frame element incorporating a twisted loop formation and the respective strut having an end thereof configured for engagement with the loop formation to provide the hinge pivotally connecting the frame element and the strut, the collapsible trap further comprising a retrieval access way for retrieval of an animal trapped in the enclosure, the retrieval access way comprising an opening in a bottom of the enclosure and a closure flap located against the opening, whereby a retrieval path can be formed upon separation of the bottom and the flap, the opening is defined by a gap between one side of the bottom and an adjacent section of a cable providing a flexible link, the bottom is defined by a rectangular mesh panel positioned within an area bounded by the cable, the rectangular mesh panel is attached on three of its four sides to the cable, the rectangular mesh panel is not attached to the adjacent section of the cable on its fourth side, thereby providing said gap between the rectangular mesh panel and the adjacent section of the cable, the retrieval access way comprises the closure flap located on an underside of the bottom against the opening, the closure flap comprises a second rectangular mesh panel which is attached to the adjacent section of the cable adjacent the opening and also to two neighbouring cable sections that neighbor the adjacent section of the cable; and wherein the rectangular mesh panel of the bottom is maintained in contact with the closure flap under weight of the animal trapped, thereby ensuring the opening is closed and the retrieval path is inaccessible to the animal trapped.

40. A collapsible trap according to claim 39 wherein the end of the respective strut is configured as a hook formation for engagement with the loop formation.

* * * * *